United States Patent
DiMeo et al.

(10) Patent No.: US 12,242,169 B2
(45) Date of Patent: Mar. 4, 2025

(54) HIGH-SPEED AUTOFOCUS CONTROL

(71) Applicant: UNIVERSITY OF MASSACHUSETTS, Boston, MA (US)

(72) Inventors: Peter DiMeo, Boston, MA (US); Jingyang Yan, Boston, MA (US); Xian Du, Boston, MA (US)

(73) Assignee: UNIVERSITY OF MASSACHUSETTS, Boston, MA (US)

(*) Notice: Subject to any disclaimer, the term of this patent is extended or adjusted under 35 U.S.C. 154(b) by 66 days.

(21) Appl. No.: 18/128,532

(22) Filed: Mar. 30, 2023

(65) Prior Publication Data

US 2023/0314909 A1    Oct. 5, 2023

Related U.S. Application Data

(60) Provisional application No. 63/326,443, filed on Apr. 1, 2022.

(51) Int. Cl.
*G03B 13/36* (2021.01)
*G03B 3/10* (2021.01)
*H04N 23/61* (2023.01)

(52) U.S. Cl.
CPC ............ *G03B 13/36* (2013.01); *G03B 3/10* (2013.01); *H04N 23/61* (2023.01)

(58) Field of Classification Search
CPC .......... G03B 13/36; G03B 3/10; H04N 23/61; H04N 23/672; H04N 23/673
USPC ...................................................... 348/345
See application file for complete search history.

(56) References Cited

U.S. PATENT DOCUMENTS

2018/0060665 A1* 3/2018 Song .................. G08B 31/00

OTHER PUBLICATIONS

S. Xie and J. Ren, "Recurrent-Neural-Network-Based Predictive Control of Piezo Actuators for Trajectory Tracking," IEEE/ASME Transactions on Mechatronics, vol. 24, No. 6, pp. 2885-2896, Dec. 2019, doi: 10.1109/TMECH.2019.2946344.

A. Shajkofci and M. Liebling, "DeepFocus: a Few-Shot Microscope Slide Auto-Focus using a Sample Invariant CNN-based Sharpness Function," arXiv:2001.00667 [cs, eess] (2020).

(Continued)

*Primary Examiner* — Usman A Khan
(74) *Attorney, Agent, or Firm* — Thomas | Horstemeyer, LLP

(57) ABSTRACT

Various examples are provided related to high-speed autofocus control. In one example, a method includes obtaining a first image of a target with a camera; adjusting focus of the camera by a specified AF bin step size; obtaining a second image of the target; adjusting focus of the camera by the specified AF bin step size; obtaining a third image of the target; determining an optimal focus using data of the second and third images; and adjusting focus of the camera to the optimal focus. In another example, a method includes generating an input vector comprising a sequence of input-output pairs associated with a piezoelectric controlled motion stage that can position a camera relative to a target; determine a control input for the motion stage using a LSTM backpropagation network trained to minimize a cost function over a defined prediction horizon; and applying the control input to the motion stage.

18 Claims, 17 Drawing Sheets

(56) References Cited

OTHER PUBLICATIONS

W. Liu, L. Cheng, C. Zhou, Z. Hou, and M. Tan, "Neural-network based model predictive control for piezoelectric-actuated stick-slip micro-positioning devices," in 2016 IEEE International Conference on Advanced Intelligent Mechatronics (AIM), Jul. 2016, pp. 1312-1317. doi: 10.1109/AIM.2016.7576951.

Yan, et al., "LSTM-based Model Predictive Control of Piezoelectric Motion Stages for High-Speed Autofocus", IEEE Transaction on Industrial Electronics, vol. 70, No. 6, Jun. 2023.

DiMeo, et al., "Fast and accurate autofocus control using Gaussian standard deviation and gradient-based binning", Optics Express, vol. 29, No. 13, Jun. 21, 2021.

Cheng, et al., "Neural-Network-Based Nonlinear Model Predictive Control for Piezoelectric Actuators", IEEE Transactions on Industrial Electronics, vol. 62, No. 12, Dec. 2015.

\* cited by examiner

A summary of the passive AF searching algorithms.

| Algorithm | Description |
|---|---|
| Global searching | Measures the FM of each step to get the best focus position |
| Fibonacci searching | Uses a divide and conquer algorithm that narrows down possible peak positions with the aid of Fibonacci numbers |
| Rule-based searching | Divides the search range into coarse, middle, and fine regions according to the possibilities of containing the global peak. A specific step size is used for a corresponding region |
| Model-based searching | Combines a discrete difference equation prediction model (DDEPM) and a bisection search algorithm to search for the best focus position. The DDEPM can predict the trend of the FM curve and locate the neighbors of the in-focus position quickly |
| Coarse to fine searching | Uses a coarse but fast search method based on the low spatial frequencies of the image, followed by a fine but slower search method based on the high spatial frequencies of the image |
| Curve-fitting searching | Fits the FM data to a curve such as a polynomial or Gaussian equation and then estimates the optimal focus and its location |
| Combined DFF and DFD | Autofocus method that combines depth from focus (DFF) and improved depth from defocus (DFD) |
| Structure tensor-based autofocusing algorithm | Autofocusing algorithm with improved edge extraction using structure tensor and Schatten norm |
| Supervised learning | Uses a labelled full focus stack to train a CNN that determines the best focus position by the single-shot image |
| Reinforcement learning | An agent selects an action from a designed legal action set and passes it to the environment. The environment triggers a state transition, returning a reward and a new observation with the goal of learning a policy that can maximize the future rewards. |

FIG. 1

2. Gradient bins and step sizes with respect to the σ of the GDER FM curve.

| BIN | Step size (σ) | Location (σ) | Gradient Bin Value (FM′) |
|---|---|---|---|
| 1 | 2 | $3 \leq x \leq -3$ | $|FM'| \leq 1.1$ |
| 2 | 1 | $-3 < x \leq -.5$ or $.5 \leq x < 3$ | $1.1 < |FM'| \leq 18.5$ |
| 3 | .5 | $-.5 < x < .5, x \neq DOF$ | $18.5 < |FM'|$ |

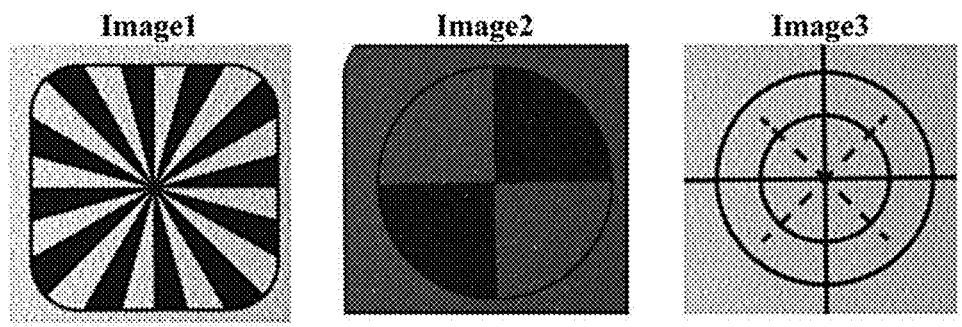
FIG. 8A
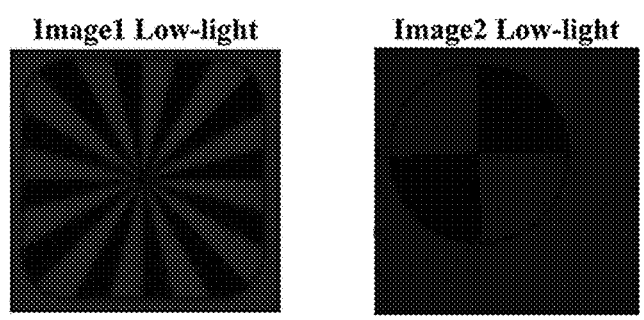
FIG. 8B
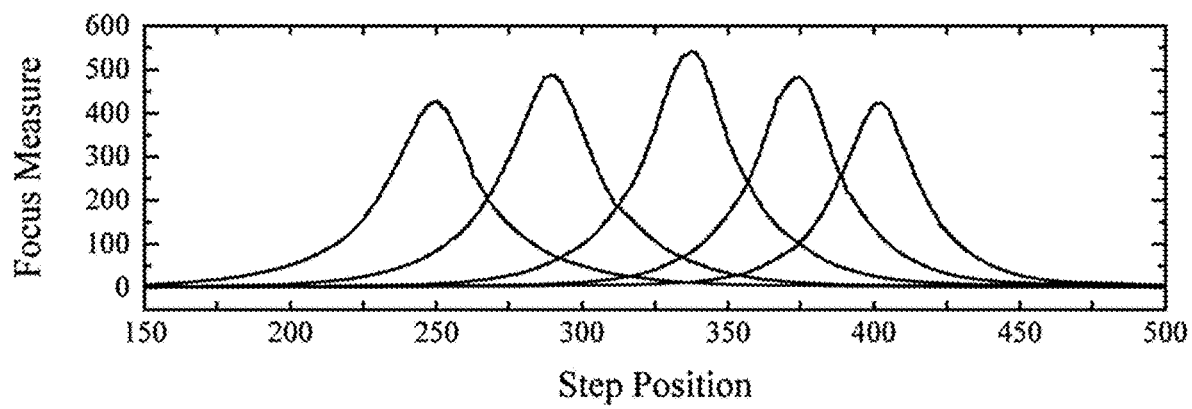
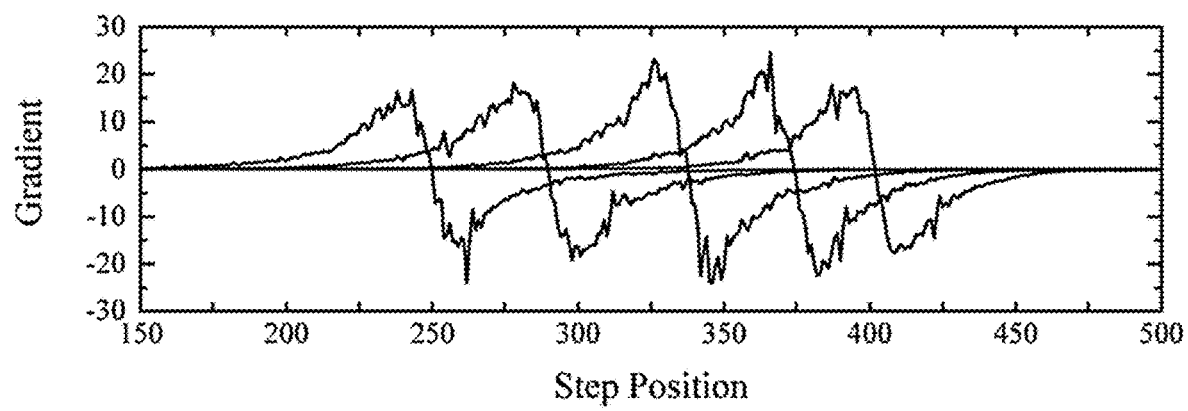
FIG. 9A

σ of the Image1 ROI with respect to the different locations of the optimal focus.

| $z_\mu$ (step position) | σ |
|---|---|
| 249 | 28.60 |
| 289 | 28.14 |
| 337 | 26.89 |
| 373 | 24.91 |
| 402 | 23.22 |

AF method performance in ideal lighting for N=32 experiments using Images1-3.

|  | GS | AHC | GB |
|---|---|---|---|
| Image1: | | | |
| Mean FM data | 608 | 23.9 | 5.42 |
| RMSE (steps) | 0.612 | 3.65 | 2.94 |
| Mean time (s) | 14.03 | 0.605 | 0.482 |
| Image2: | | | |
| Mean FM data | 608 | 24.1 | 6.06 |
| RMSE (steps) | 3.50 | 1.62 | 1.92 |
| Mean time (s) | 10.57 | 0.520 | .450 |
| Image3: | | | |
| Mean FM data | 608 | 25.1 | 6.42 |
| RMSE (steps) | 3.08 | 1.79 | 3.16 |
| Mean time (s) | 10.4 | 0.628 | 0.609 |
| Average: | | | |
| FM data | 608 | 24.4 | 5.97 |
| RMSE (steps) | 2.40 | 2.35 | 2.67 |
| Time (s) | 11.9 | .584 | .514 |

FIG. 11A

GB AF method performance in low-light for N=32 experiments using Images1-2.

|  | GB |
|---|---|
| Image1: | |
| Mean Images | 6.02 |
| RMSE (steps) | 3.81 |
| Mean Time (s) | .5647 |
| Image2: | |
| Mean Images | 6.00 |
| RMSE (steps) | 3.73 |
| Mean Time (s) | .7518 |

FIG. 11B

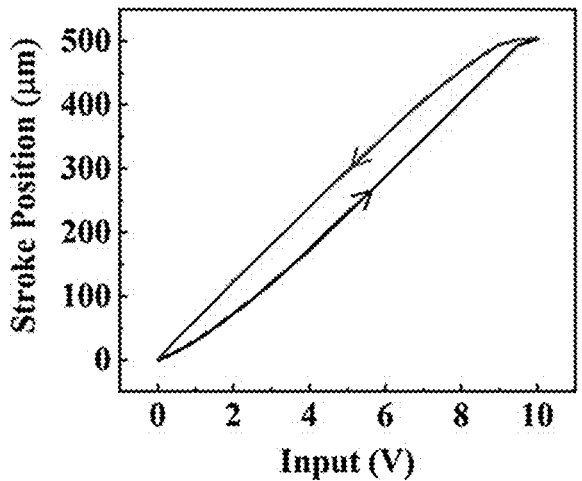
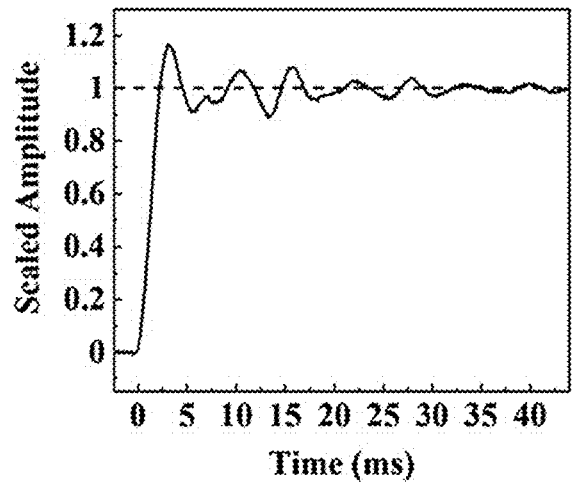

Algorithm 1: Standard BPTT

Input: prediction horizon $P$, control horizon $M$, input feature $\mathbf{x}(t+1)$, control input sequence $U$ Output: Jacobian matrix $\frac{\partial y_p(t+i)}{\partial \mathbf{x}(t+j)}$ $i \in [1, P], j \in [1, i]$ 1 Initialization: concatenated input vector to the LSTM
  input $= [\,], p = 1$;
2 while $p \leq P$ do
3     input $= [\text{input}; \mathbf{x}(t+p)]$;
4     calculate $y_p(t+p)$ through $p$ steps forward propagation;
5     calculate $\frac{\partial y_p(t+p)}{\partial \text{input}}$ using BPTT;
6     $y(t+p) = y_p(t+p)$;
7     if $p \geq M$ then
8        $u(t+p) = u(t+M)$;
9     end
10     $\mathbf{x}(t+p+1) = [u(t+p+1), u(t+p), ..., u(t+p-n_u), y(t+p), y(t+p-1), ..., y(t+p-n_y)]$;
11     $p = p+1$;
12 end

FIG. 15A

Algorithm 2: The improved BPTT

Input: prediction horizon $P$, control horizon $M$, input feature $\mathbf{x}(t+1)$, control input sequence $\mathbf{U}$, input vector length $n_x$, number of hidden units $n_p$

Output: Jacobian matrix $\frac{\partial y_p(t+i)}{\partial \mathbf{x}(t+j)}$ $i \in [1, P], j \in [1, i]$ 1 Initialization: input $= zeros(P, n_x)$, c_cache $= zeros(P, n_p)$, h_cache $= zeros(P, n_p)$, i_cache $= zeros(P, n_p)$, f_cache $= zeros(P, n_p)$, o_cache $= zeros(P, n_p)$, g_cache $= zeros(P, n_p)$;
2 while $p \leq P$ do
3     input$(p, :) = \mathbf{x}(t+p)$;
4     $\mathbf{i}(t+p) = \delta(\mathbf{W}_{xi}\mathbf{x}(t+p) + \mathbf{W}_{hi}\mathbf{h}(t+p-1) + \mathbf{b}_i)$;
5     $\mathbf{f}(t+p) = \delta(\mathbf{W}_{xf}\mathbf{x}(t+p) + \mathbf{W}_{hf}\mathbf{h}(t+p-1)) + \mathbf{b}_f)$;
6     $\mathbf{o}(t+p) = \delta(\mathbf{W}_{xo}\mathbf{x}(t+p) + \mathbf{W}_{ho}\mathbf{h}(t+p-1)) + \mathbf{b}_o)$;
7     $\mathbf{g}(t+p) = \tanh(\mathbf{W}_{xg}\mathbf{x}(t+p) + \mathbf{W}_{hg}\mathbf{h}(t+p-1)) + \mathbf{b}_g)$;
8     $\mathbf{c}(t+p) = \delta(\mathbf{f}(t+p) \odot \mathbf{c}(t+p-1) + \mathbf{i}(t+p) \odot \mathbf{g}(t+p))$;
9     $\mathbf{h}(t+p) = \mathbf{o}(t+p) \odot \delta(\mathbf{c}(t+p))$;
10    c_cache$(p, :) = \mathbf{c}(t+p)$;
11    h_cache$(p, :) = \mathbf{h}(t+p)$;
12    i_cache$(p, :) = \mathbf{i}(t+p)$;
13    f_cache$(p, :) = \mathbf{f}(t+p)$;
14    o_cache$(p, :) = \mathbf{g}(t+p)$;
15    g_cache$(p, :) = \mathbf{o}(t+p)$;
16    calculate $y_p(t+p)$ ;
17    calculate $\frac{\partial y_p(t+p)}{\partial \text{input}(1:p,:)}$ regarding c_cache$(1:p,:)$, h_cache$(1:p,:)$, i_cache$(1:p,:)$, f_cache$(1:p,:)$, o_cache$(1:p,:)$, g_cache$(1:p,:)$;
18    $y(t+p) = y_p(t+p)$;
19    if $p \geq M$ then
20       $u(t+p) = u(t+M)$;
21    end
22    $\mathbf{x}(t+p+1) = [u(t+p+1), u(t+i), ..., u(t+p-n_u), y(t+p), y(t+p-1), ..., y(t+p-n_y)]$;
23    $p = p + 1$;
24 end

FIG. 15B

Algorithm 3: Calculation of $\frac{\partial y_p}{\partial U}$

Input: prediction horizon $P$, control horizon $M$, Jacobian matrix $\frac{\partial y_p(t+i)}{\partial x(t+j)}$ $i \in [1, P], j \in [1, i]$

Output: Jacobian matrix $\frac{\partial y_p(t+i)}{\partial u(t+j)}$ $i \in [1, P], j \in [1, M]$ 1    while $m \leq M$ do
2      while $p \leq P$ do
3        if $p \leq M$ then
4          $\frac{\partial y_p(t+p)}{\partial u(t+m)} = \sum_{k=1}^{p} \left( \frac{\partial y_p(t+p)}{\partial x(t+k)}(p) \right) + \sum_{l=1}^{n_y} \frac{\partial y_p(t+p)}{\partial x(t+k)}(n_u + 1 + l) \times \frac{\partial y_p(t+k-l)}{\partial u(t+m)}$;
5        else
6          if $m \neq M$ then
7            $\frac{\partial y_p(t+p)}{\partial u(t+m)} = \sum_{k=1}^{M} \left( \frac{\partial y_p(t+p)}{\partial x(t+k)}(p) \right) + \sum_{l=1}^{n_y} \frac{\partial y_p(t+p)}{\partial x(t+k)}(n_u + 1 + l) \times \frac{\partial y_p(t+k-l)}{\partial u(t+m)}$;
8          else
9            $\frac{\partial y_p(t+p)}{\partial u(t+m)} = \sum_{k=1}^{M} \left( \sum_{n=1}^{p-M} \frac{\partial y_p(t+p)}{\partial x(t+k)}(p+n) + \sum_{l=1}^{n_y} \frac{\partial y_p(t+p)}{\partial x(t+k)}(n_u + 1 + l) \times \frac{\partial y_p(t+k-l)}{\partial u(t+m)}\right)$;
10          end
11        end
12      $p = p + 1$;
13      end
14    $m = m + 1$;
15 end

FIG. 15C

AUTOFOCUS METHOD PERFORMANCE AND EVALUATION METRICS FOR THE AIR FORCE TARGET

| Method | Mean No. Images | Std. No. Images | Time (ms) |
|---|---|---|---|
| Random CL | 20.30 | 18.84 | 1015 |
| Fibonacci CL | 4.56 | 1.39 | 228.1 |
| G. Binning CL | 6.61 | 3.11 | 330.3 |
| CNN CL | 5.84 | 5.82 | 777.6 |
| ConvLSTM CL | 5.01 | 5.04 | 275.6 |
| LSTM-MPC CL | 5.18 | 1.59 | 259.0 |
| Random OL | 15.08 | 12.14 | 316.7 |
| Fibonacci OL | - | - | - |
| G. Binning OL | - | - | - |
| CNN OL | - | - | - |
| ConvLSTM OL | - | - | - |
| LSTM-MPC OL | 6.28 | 6.25 | 157.1 |

*OL = open-loop *CL = closed-loop

FIG. 21A

RUNTIME FOR KEY ROUTINES IN THE PROPOSED AUTOFOCUS METHOD

| Routine | Time consumption (ms) |
|---|---|
| Image acquisition | < 1 |
| Image processing | 6 |
| Optimization | 3.7 |
| Motor movement | 15 |
| Total time | 25 |

FIG. 21B

HIGH-SPEED AUTOFOCUS CONTROL

CROSS REFERENCE TO RELATED APPLICATIONS

This application claims priority to, and the benefit of, U.S. provisional application entitled "High-Speed Autofocus Control" having Ser. No. 63/326,443, filed Apr. 1, 2022, which is hereby incorporated by reference in its entirety.

STATEMENT REGARDING FEDERALLY SPONSORED RESEARCH OR DEVELOPMENT

This invention was made with government support under grant number CMMI 1916866 awarded by the National Science Foundation. The Government has certain rights in the invention.

This invention was also made with government support under grant numbers CMMI 1942185 and CMMI 1916866 awarded by the National Science Foundation. The Government has certain rights in the invention.

BACKGROUND

Production quality control relies heavily on the inline inspection of manufacturing processes, e.g., the real-time monitoring and metrology for the microcontact printing of flexible electronics. High-speed and high-accuracy image acquisition and image processing techniques facilitate the measurement of electronic pattern production, however, many of these techniques are not sufficient for industrial inspection due to their lack of real-time application. If image focusing is required for high-speed inline inspection, these image techniques can create manufacturing bottlenecks due to their slower autofocus (AF) methods. For example, in-line inspection plays an important role in the quality control of roll-to-roll (R2R) flexible electronics printing processes. Due to the vibrations of the moving substrates and the micro and nanoscale size of the printed patterns, high-speed AF is important for the real-time imaging of the flexible electronics. A simple step motor-based AF system cannot meet the high-speed requirements due to the slow motor motion control where the step motor movement consumes more than 77% of the overall AF time. Fast and continuous image-based AF is also utilized for many other scenarios, such as the imaging and metrology of biological samples or scenarios where non-image-based AF methods pose risks to damaging heat or photo-sensitive biological samples.

SUMMARY

Aspects of the present disclosure are related to high-speed autofocus control. In one aspect, among others, a method for autofocusing, comprising: obtaining a first image of a target with a camera; adjusting focus of the camera by a specified autofocus (AF) bin step size; obtaining a second image of the target with the camera; adjusting focus of the camera by the specified AF bin step size; obtaining a third image of the target with the camera; determining an optimal focus based at least in part upon focus measure (FM) data of the second and third images; and adjusting focus of the camera to the optimal focus. The optimal focus can be determined using a direct Gaussian mean calculation. The FM data can comprise Gaussian derivative FM scores. The optimal focus can be determined in response to the FM score of the third image being less than or equal to the FM score of the second image. The optimal focus can be based at least in part upon FM data of the first, second and third images.

In one or more aspects, the method can comprise adjusting focus of the camera by the specified AF bin step size; and obtaining a fourth image of the target with the camera in response to the FM score of the third image being less than the FM score of the second image. The optimal focus can be based at least in part upon FM data of the second, third and fourth images. The specified AF bin step size can be determined based at least in part upon a defocus gradient of a Gaussian FM curve associated with the camera. The specified AF bin step size can be selected based upon standard deviation of the Gaussian FM curve. In various aspects, the method can comprise obtaining an image of the target with the camera at the optimal focus. The target can be an item or component for inspection. The method for autofocus can be initiated in response to detecting the target.

In another aspect, a method for autofocus comprises generating an input vector comprising a sequence of input-output pairs associated with a piezoelectric controlled motion stage configured to position a camera relative to a target; determine a control input for the piezoelectric controlled motion stage using a long short-term memory (LSTM) backpropagation network trained to minimize a cost function over a defined prediction horizon; and applying the control input to the piezoelectric controlled motion stage, the control input shaped by an S-curve control input profile. The piezoelectric controlled motion stage can be a piezoelectric motion stage. The piezoelectric controlled motion stage can comprise piezoelectric actuators.

In one or more aspects, the input vector can comprise position information of the piezoelectric controlled motion stage and focus scores of images captured by the camera at corresponding positions. The cost function can comprise a squared error between a reference signal and a predicted output of the LSTM backpropagation network and a weighted squared change of the control input. The LSTM backpropagation network can be trained using a backpropagation through time (BPTT) algorithm comprising pre-allocation for expedited gradient calculation. In various aspects, the BPTT algorithm can comprise calculating derivatives of predicted focus measurement to generated intermediate control input by applying a chain rule through time. The method can comprise training the LSTM backpropagation network with training data generated using a pulse-train method applied to the piezoelectric controlled motion stage. The pulse-train method can comprise applying a series of pulses with random amplitudes to capture non-linear dynamics of the piezoelectric controlled motion stage.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a table illustrating examples of passive AF searching algorithms, in accordance with various embodiments of the present disclosure.

FIGS. 8A and 8B illustrate examples of imaging targets (350×350 pixels) in ideal 3500lx and low-light 450lx conditions used for evaluation, in accordance with various embodiments of the present disclosure.

FIGS. 9A and 9B illustrate similarity between GDER FM and FM' curves of Image1 of FIG. 8A with respect to different $z_\mu$, in accordance with various embodiments of the present disclosure.

FIG. 10 illustrates an example of how the RMSE data is collected after a complete AF iteration, in accordance with various embodiments of the present disclosure.

FIGS. 11A and 11B are tables illustrating examples of the AF methodology performance, in accordance with various embodiments of the present disclosure.

FIGS. 14A and 14B illustrate examples of the hysteresis effect and jitters, in accordance with various embodiments of the present disclosure.

FIGS. 15A-15C illustrate examples of algorithms for cost function minimization, in accordance with various embodiments of the present disclosure.

FIGS. 21A and 21B are tables illustrating examples of AF method performance and routine runtimes, in accordance with various embodiments of the present disclosure.

DETAILED DESCRIPTION

Figure 2:
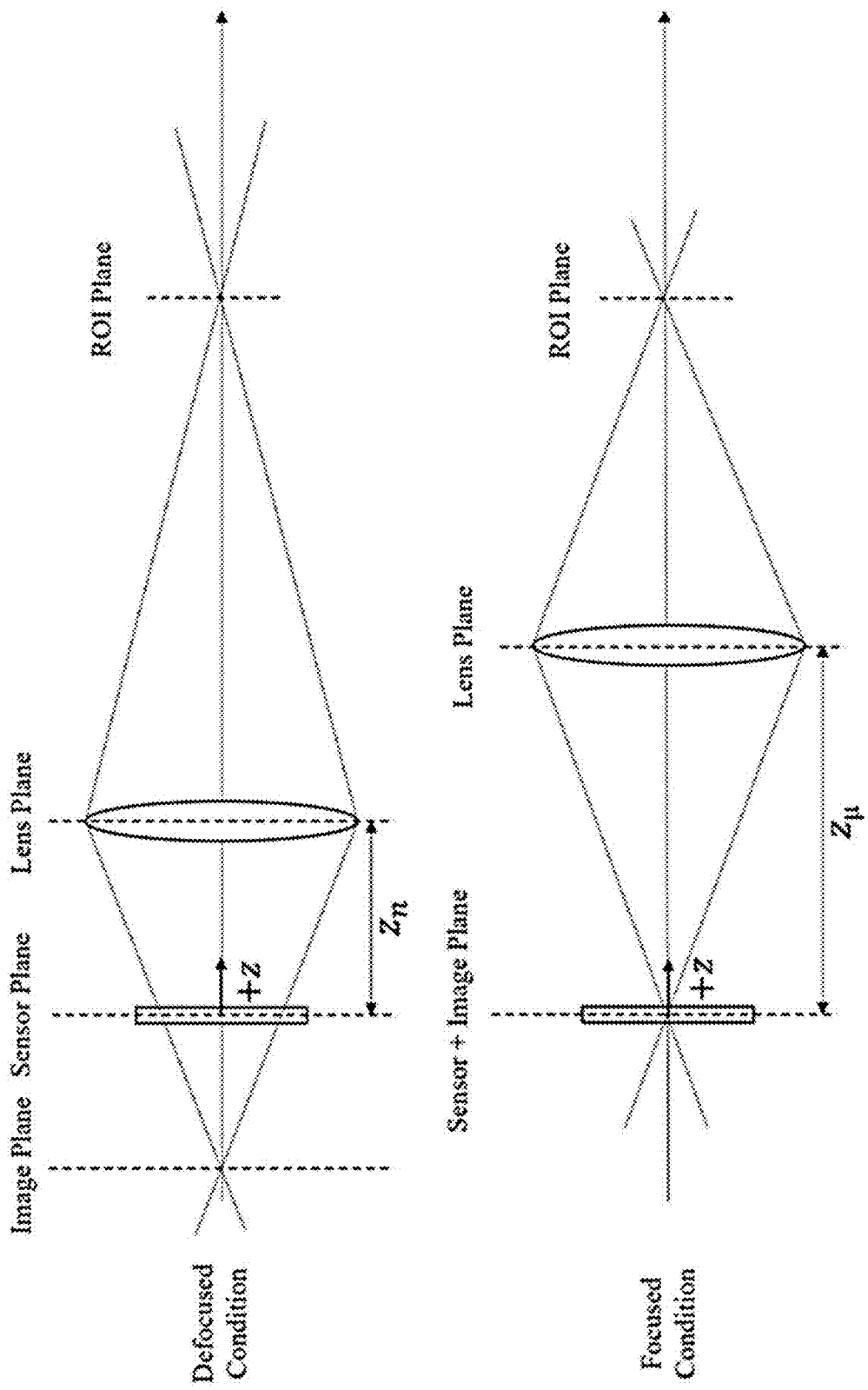
FIG. 2 illustrates an example of variable parameters for a Gaussian model describing the focus measure curve of a single planar region of interest displayed via a single focused and defocused condition, in accordance with various embodiments of the present disclosure.

Disclosed herein are various examples related to high-speed autofocus control. To begin, a fast and accurate autofocus (AF) methodology using Gaussian standard deviation and gradient-based binning is disclosed. Rather than iteratively searching for the optimal focus using an optimization process, the AF algorithm can directly calculate the mean of the Gaussian shaped focus measure (FM) curve to find the optimal focus location and use the FM curve standard deviation to adapt the motion step size. The calculation can be accomplished using only 3-4 defocused images to identify the center location of the FM curve. By assigning motion step sizes based on the FM curve standard deviation, the magnitude of the motion step can be adaptively controlled according to the defocused measure, thus avoiding overshoot and unneeded image processing. Experimental verification showed that the AF methodology is faster than the state-of-the-art Adaptive Hill-Climbing (AHC) and offers satisfactory accuracy as measured by root-mean-square error. The AF methodology utilized 80% fewer images for focusing compared to the AHC method. Moreover, due to this significant reduction in image processing, the AF methodology reduced the autofocus time to completion by 22% compared to the AHC method. Similar performance of the AF methodology was observed in both well-lit and low-lighting conditions.

Next, a neural network-based model predictive control of piezoelectric motion stages for autofocus is disclosed. Rather than using an internal controller to account for the problematic hysteresis effects of the piezoelectric motion stage, the long short-term memory unit can be used to integrate the hysteresis effects and the focus measurement into a single learning-based model. Subsequently, a model predictive control methodology is developed based on this long short-term memory model that successfully finds the optimal focus position using a series of focus measurements derived from a sequence of images. To further improve the speed of the long short-term based model predictive control, an optimized backpropagation algorithm is presented that optimizes the model predictive control cost function. Experiments verified that the model predictive control methodology reduced the autofocus time by at least 30% when compared to well-known ruled-based autofocus methods and other learning-based methods.

The disclosed methodologies can be used individually or in combination to provide fast and accurate autofocus control. Reference will now be made in detail to the description of the embodiments as illustrated in the drawings, wherein like reference numbers indicate like parts throughout the several views.

Fast and Accurate Autofocus Control Using Gaussian Standard Deviation and Gradient-Based Binning Image-based AF techniques seek to adjust the distance between the camera sensor plane and the lens plane such that the region of interest (ROI) has the maximum possible sharpness. The state-of-the-art, image-based AF techniques have to acquire a large number of both defocused and focused images to converge to an optimal focus location or train a focus learning model to estimate the optimal focus location. These techniques are either too slow for real-time imaging applications, are extremely computationally expensive, or require training a model that is specific to the imaging configuration. A high performance autofocus technology that utilizes fewer images as input and reduces the computational complexity needed for fast image-processing time can address many of those limitations.

In this disclosure, a fast and accurate autofocus algorithm using Gaussian standard deviation and gradient-based binning is presented. Instead of iteratively searching for the optimal focus using an optimization process, the proposed algorithm can directly calculate the mean of the Gaussian shaped FM curve to find the optimal focus location and uses the FM curve standard deviation to adapt the motion step size. The calculation can identify the center location of the FM curve within only 3-4 defocused images. Furthermore, based on scale-space theory, the standard deviation of the curve can be used as the base scale for adapting the motion step size. By assigning adaptive step sizes to different bins based on initial focus measurement, the magnitude of the motion step is determined via the defocused measure, thus resulting in a highly efficient method for image-based AF.

Classic AF methods in literature can be divided into two categories, active and passive. The active AF methods use additional hardware, e.g., laser and motor, to measure the distance between camera and object to maintain a stable focus distance. This method can result in steady AF control via the information from the ground truth focus measurement but increases the complexity and the cost of the system due to the necessary use of a laser. For example, a hand-hold fiber-optic Raman probe with both active and passive autofocus functions has been developed. The introduction of active AF methods aims to remove limitations surrounding focusing accuracy that can arise with varying image content (e.g., low-contrast imaging samples or low-light conditions). However, active methods pose their own limitations. In some scenarios, active AF methods can only measure the distance between a reflective surface and the camera. This can create issues when imaging non-reflective targets where the distance between region of interest and camera cannot be measured. Additionally, in some scenarios, active AF methods may not be applicable, e.g., when imaging photosensitive slides that are not capable of being irradiated by a laser beam.

Alternatively, rather than using hardware, passive AF methods use a search algorithm to find the best focus position. Passive AF, in essence, is simply stated as the autonomous navigation from a defocused image to a focused one. To establish whether an image is focused or defocused, focus measure functions (FMFs) are used. These FMFs assign a scalar value, called focus measure (FM), to an ROI using a variety of methods. A focus measure curve simply refers to the two-dimensional relationship between the variable distances between sensor and lens planes and the respective FM scores. Passive sensing for AF includes phase-based methods and contrast-based methods. The selection of phase or contrast-based AF depends on the method of image acquisition. If the images are captured by a camera equipped with a phase detector, or by a light field camera, also known as plenoptic camera, phase-based methods could be used. Quad-pixel sensor technology that could use phase-based methods has also been studied. Otherwise, contrast-based methods are used for AF control.

In contrast-based AF methods, an FM is extracted from the ROI inside an image captured by the camera. The objective of a contrast-based AF procedure is to maximize this FM. Typical FMFs used for AF control vary widely, ranging from simple gradient methods to wavelet and Laplacian based methods. By principle, these methods operate under the focus-defocus contrast assumption. This assumption states that focused images inherently have more detail than defocused images, meaning the relative degree of focus can be quantified by the level of detail present in an image. Many FMFs, such as the Gaussian Derivative (GDER) method chosen for this discussion, operate under this basic contrast assumption. Many algorithms were put forward to fulfill the contrast-based AF task, such as global searching, Fibonacci searching, rule-based searching, curve fitting, prediction model, combined DFF and DFD methods, and structure tensor-based autofocusing algorithms, etc. Global searching can make sure the peak FM will not be missed in the AF control process but is limited by its long searching time. Other rule-based searching methods can speed up the searching process but can sometimes converge to local maxima instead of global maxima. Curve fitting algorithms are often more accurate than other searching methods however require large quantities of FM data and long AF times.

One approach to reducing AF time involves the application of various machine learning algorithms, including supervised learning and reinforcement learning. A convolution neural network (CNN) can be used for both types of learning algorithms. For example, a deep learning pipeline structure with a global step estimator and a focus discriminator for AF control can be used. Both the global step estimator and the focus discriminator can share a CNN structure and by using this supervised learning method, AF control can be achieved with far fewer search steps than rule-based and Fibonacci searching methods. A CNN consisting of two convolution blocks followed by two fully connected layers for the time-lapse microscopy of growing and moving cell samples can also be used. A DeepFocus CNN-based FMF used for microscopy AF control was developed where an FM curve was provided whose shape, up to axial scaling, is invariant to the sample. Using this FMF, AF could be achieved in far fewer iterations when compared to standard FMFs. Furthermore, a supervised learning method was developed for both contrast-based AF and phase-based AF where MobileNetV2 was used for their portable device. The table of FIG. 1 summarizes examples of search algorithms used for passive autofocus.

Autofocus Control

Gaussian model for focus measure. Scale-space theory indicates that the relative degree of blur due to image defocus follows the Gaussian model. It also leads to the use of the first-order Gaussian derivative to quantify the focus measure. In this case, the quantitative representation of FM calculated by GDER will also follow the same Gaussian model. Although various gradient and Laplacian based FMFs operate faster than GDER, these methods do not take advantage of the physical relationship between defocused and focused images defined by true Gaussian blur. The FM curve can be estimated by sampling the FM at different levels of focus. For the purpose of proposing a fast and accurate AF algorithm, the GDER method for FM evaluation is chosen due to its superior ability to consistently return an FM curve resembling the Gaussian model with satisfactory precision, recall, and absolute error. The GDER method used to calculate the FM scores is defined as $$FM(x, y, \sigma) = \frac{1}{NM} \sum_{x,y} [[f(x, y) \cdot G_x(x, y, \sigma)]^2 + f(x, y) \cdot G_y(x, y, \sigma)]^2], \quad (1)$$

where $\sigma$ is a scaling constant, $f(x, y)$ is the image gray value at pixel coordinates $(x, y)$, $G_x(x, y, \sigma)$ and $G_y(x, y, \sigma)$ are respectively the first-order Gaussian derivatives in the x- and y-directions at scale $\sigma$, and NM is the total number of pixels in the ROI. The Gaussian model describing the FM curve of a single planar ROI calculated by the GDER FMF is defined as $$f_n(z_n) = Ae^{-\frac{1}{2}\left(\frac{z_n - z_\mu}{\sigma}\right)^2}, \quad (2)$$

where A, $z_n$, $z_\mu$, and $\sigma$ is a scaling constant, the distance between the sensor plane and lens plane, the distance between the sensor plane and lens plane with the maximum FM score, and the standard deviation of the FM curve given specified ROI content, respectively. FIG. 2 visually displays the variable parameters $z_n$ and $z_\mu$ from Eq. (2) using a focused and defocused condition.

A typical example of AF utilizing the Gaussian model involves both a fixed sensor and lens plane. For these situations, a focused condition is accomplished by moving the ROI plane (i.e., the object) either closer to or farther away from the sensor and lens planes (i.e., the camera). This situation can be easily adapted to the alternative application of a fixed ROI plane and variable focus lens. Note that ROIs of an object comprised of targets at two or multiple planar positions can be deduced as multimodal Gaussian curves; the multimodal curve being the sum of each independent Gaussian distribution where the number of planes equates to the number of local maxima. With the sole intention of proposing a novel AF algorithm, single planar targets are chosen to eliminate the multimodality of the FM curve to further resemble imaging targets used in machine vision-based sensing, metrology, pattern analysis, and feedback control, as these industries demonstrate the greatest need for fast and accurate AF.

Gaussian regression for autofocus. Given limited data, the FM curve of Eq. (2) can be approximated via Gaussian regression. Such a regression serves as an excellent way to approximate an FM model and find an optimal focus location, but issues surrounding Gaussian regression for AF are twofold: large quantities of data are needed to regress a model typically acquired through a slow global search, and if a global search is not used, FM data needs to be local relative to $z_\mu$. Non-$z_\mu$-local FM data is seldom used because the necessary step size between points to gather information that accurately describes the curve remains unknown during AF. Furthermore, regression models aim to fine-tune all parameters to minimize a specified loss function, which is both computationally expensive and unnecessary as $z_\mu$ is the only parameter describing the location of the optimal focus. Hence, using Gaussian regression-based methods for all three parameters of Eq. (2) for an optimal focus search is unreasonable for fast and accurate AF control.

Direct Gaussian mean calculation. As previously stated, achieving complete AF control needs knowledge of the location of $z_\mu$ at the instantaneous level of defocus. Mathematically, the three parameters A, $z_\mu$, and $\sigma$, in Eq. (2) can be solved given any three FM data on the curve so long as they are non-linearly correlated. From Eq. (2), the location of the optimal focus, $z_\mu$ can be derived by $$z_\mu = \frac{\ln\left(\frac{f_n}{f_{n-1}}\right)(z_{n-1} + z_{n-2})(z_{n-1} - z_{n-2}) - \ln\left(\frac{f_{n-1}}{f_{n-2}}\right)(z_n + z_{n-1})(z_n - z_{n-1})}{2\left(\ln\left(\frac{f_n}{f_{n-1}}\right)(z_{n-1} - z_{n-2}) - \ln\left(\frac{f_{n-1}}{f_{n-2}}\right)(z_n - z_{n-1})\right)}, \quad (3)$$

where $z_{n-2}$, $z_{n-1}$, $z_n$ are three unique distances between lens and sensor planes and $f_{n-2}$, $f_{n-1}$, $f_n$ are the respective GDER FM scores. Eq. (3) offers significant advantages in computation time compared to standard Gaussian regression models, as there is no optimization for independent parameters and only the value of interest, $z_\mu$, is returned. If only three FM data are used as inputs to a standard regression, provided the data meets conditions of feasibility (i.e., non-linearly correlated), the values of $z_\mu$ from Eq. (3) and the regressed model are equivalent. This allows the optimal focus to be calculated directly without first having to call a curve fitting function.

The accuracy of the calculated $z_\mu$ value compared to that of a fully regressed model is dependent on many factors. Given a perfect Gaussian, any combination of valid FM data will return the identical value of $z_\mu$ using both methods; however, perfect Gaussian FM data for Eq. (3) intended for robust AF control rarely exists. Theoretically, three local FM data with step sizes of one could calculate the correct value of $z_\mu$, but due to noise and error from imaging system illumination, and motion localization, this method is infeasible. Assessing FM data locally for all AF methods has significant limits, especially with predictive models using highly defocused FM data where the signal to noise ratio poses significant risks to the accuracy of the Eq. (3) calculation. For this reason, a novel method to intelligently select FM data from the Gaussian FM curve was developed.

Figure 3:
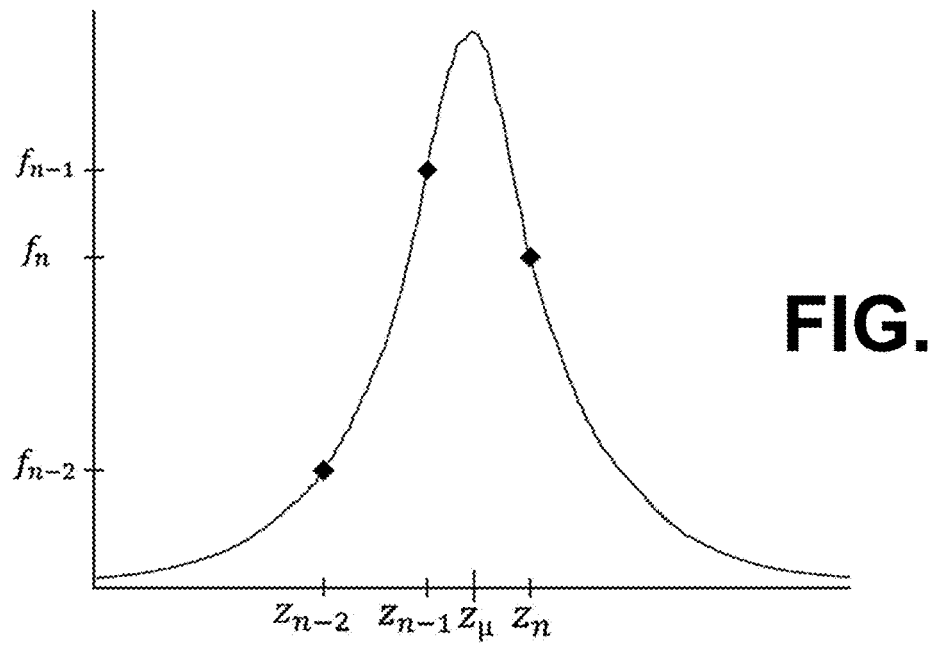
FIG. 3 illustrates an example of conditions for calculating an optimal focus, in accordance with various embodiments of the present disclosure.

Step sizes based on focus measure curve standard deviation. Achieving an accurate value of $z_\mu$ using Eq. (3) is highly dependent on obtaining FM data that distinctly follows Gaussian curvature (i.e., non-linear, non-asymptotic, minimal influence from noise.) Theoretically, three data unilateral to $z_\mu$ could return an accurate calculation, however small variations in these data (i.e., system noise) can have drastic effects on the accuracy of Eq. (3), even if the FM data are non-local. To virtually remove this limitation from the direct calculation, the three FM data need to be located bilateral to $z_\mu$. Introducing the simple condition of $f_n < f_{n-1}$, provided the data is Gaussian and steps are made in the direction of $z_\mu$, guarantees that $f_{n-2}$, $f_{n-1}$, and $f_n$ are not linearly correlated and are located bilateral to $z_\mu$. AF situations that satisfy this condition do so because $z_\mu$ resides in the range bounded by $z_n$ and $z_{n-2}$. Using this condition for limiting the influence of system noise allows the AF methodology to be robust enough for fast and accurate AF control. FIG. 3 illustrates the method for acquiring bilateral FM data necessary to use Eq. (3) for Gaussian model AF control.

Three FM data that distinctly follow Gaussian curvature can accurately calculate $z_\mu$ using Eq. (3); however, knowing the step size between the three FM data needed to achieve this remains virtually unknown. As the dispersion of the Gaussian FM curve is governed by its standard deviation, a step size based on the standard deviation of the FM curve can be introduced. For various defocus conditions, different Gaussian FM scores are obtained. This is a direct reflection of scale-space theory and the resultant point spread at different scales quantified by the GDER FMF. Therefore, it is appropriate to use the standard deviation as the base scale to adapt the step size at different defocus regions of the FM curve. This finding can be corroborated through introduction of Gaussian blur to an image by increasing its content standard deviation.

Introducing an adaptive step size based on the fundamental dispersion of the FM curve can ensure that the three FM data meet the previously mentioned conditions and are obtained without significant overshoot, a drawback to many AF control algorithms today. For instance, in FIG. 3, given an initial location $z_{n-2}$ with a distance of $1\sigma$ to $z_\mu$, a step size of $0.75\sigma$ would guarantee that $f_n < f_{n-1}$ using only three FM data. However, the same $0.75\sigma$ step size at a different $z_{n-2}$ position may not be as effective for fast AF as either more FM data or a different step size would be needed to satisfy $f_n < f_{n-1}$ without significant overshoot. This method for adapting the step size as either multiples or fractions of the standard deviation of the FM curve performs optimally, so long as the proper $\sigma$ step size is chosen.

The $\sigma$ of the ROI modeled by the GDER FMF which will be used as the base scale for an adaptive step size can be calculated using any three FM data, provided the data meet the same conditions necessary for Eq. (3). The $\sigma$ of the GDER FM curve is defined as $$\sigma = \sqrt{\frac{z_{n-2} - z_{n-1}}{2\left(\frac{\ln\left(\frac{f_{n-1}}{f_n}\right)}{z_{n-1} - z_n} + \frac{\ln\left(\frac{f_{n-2}}{f_n}\right)}{z_n - z_{n-2}}\right)}}, \quad (4)$$

where $z_{n-2}$, $z_{n-1}$, $z_n$ are three unique distances between lens and sensor planes and $f_{n-2}$, $f_{n-1}$, $f_n$ are the respective GDER FM scores. The location of $z_{n-2}$ relative to $z_\mu$ is needed to adapt the step sizes based on $\sigma$ to guarantee satisfactory FM data. By principle, both the location of $z_\mu$ and its respective distance to $z_{n-2}$ remains unknown during passive AF; however, due to the superior ability of GDER FMF to return Gaussian FM data, its distance can be approximated based on the gradient at the location of $z_{n-2}$. This can be accomplished via Gaussian derivative binning detailed below.

Gaussian derivative binning. According to scale-space theory, the FM curve, measured by the GDER FMF, quantifies the change of scale of an ROI as a function of the distance between the sensor and lens planes for any camera and lens. So long as the position of the ROI remains unchanged, the distance between sensor and lens plane ($z_n$) is the only variable that can change the image scale perceived by the camera sensor. If the planar position of the ROI changes, there are now two independent variables affecting the perceived scale of the image, the previous distance between sensor and lens planes ($z_n$) and the new distance between sensor and lens planes corresponding to the maximum FM ($z_\mu$). The difference of these two variables is expressed in Eq. (2) as $z_n - z_\mu$. When the difference of these two variables is zero, meaning $z_n = z_\mu$, the FM curve reaches its maximum with its corresponding minimum image scale. This location, where both planar positions are equivalent, is the location of the optimal focus. If the location of the maximum FM and its respective minimum scale depends solely on the positions of $z_n$ and $z_\mu$, it can be concluded that $\sigma$ in Eq. (2) is invariant to the position. Furthermore, this allows a conclusion that $\sigma$ only serves to describe the dispersion of image scale relative to $z_\mu$.

Figure 4A:
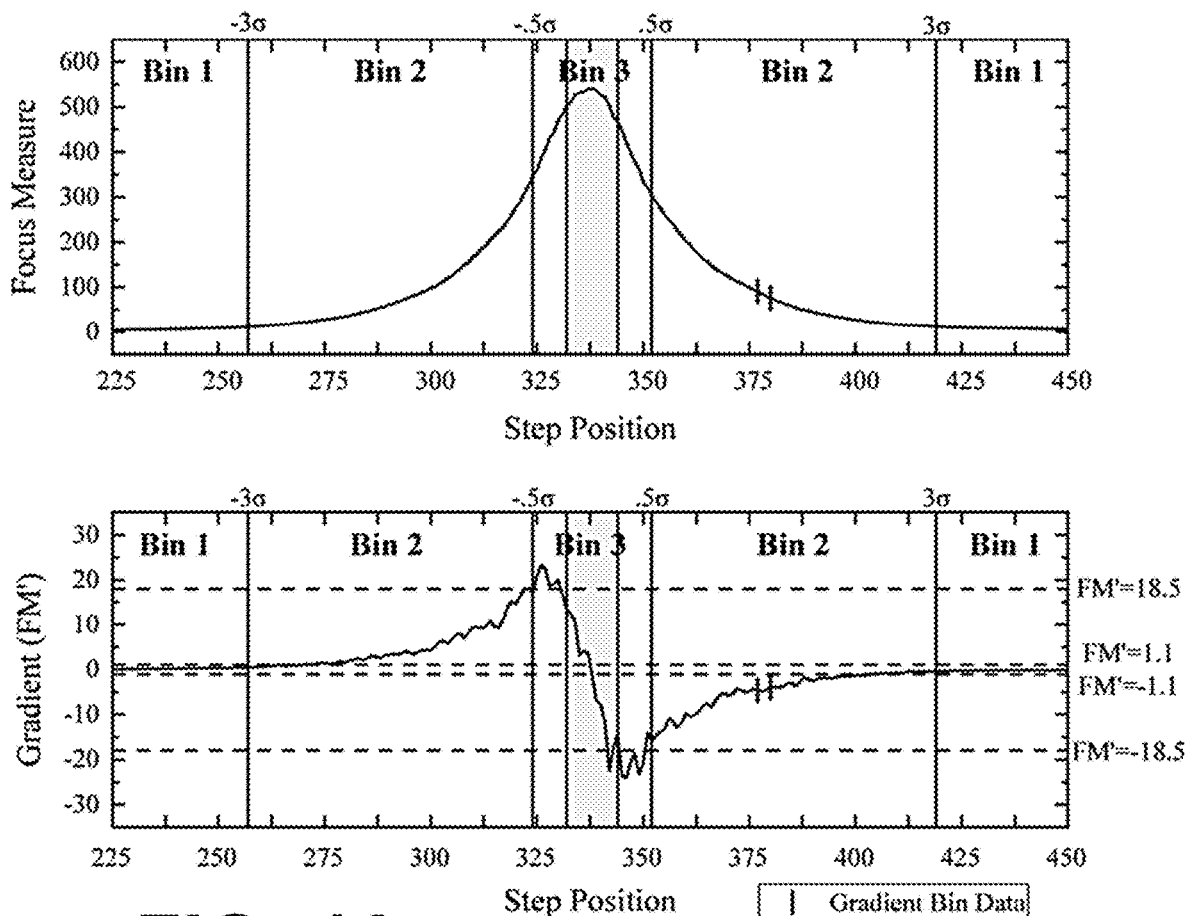
FIGS. 4A and 4B illustrate an example of gradient bins on the FM and FM' curves, in accordance with various embodiments of the present disclosure.
Figures 4B, 6:
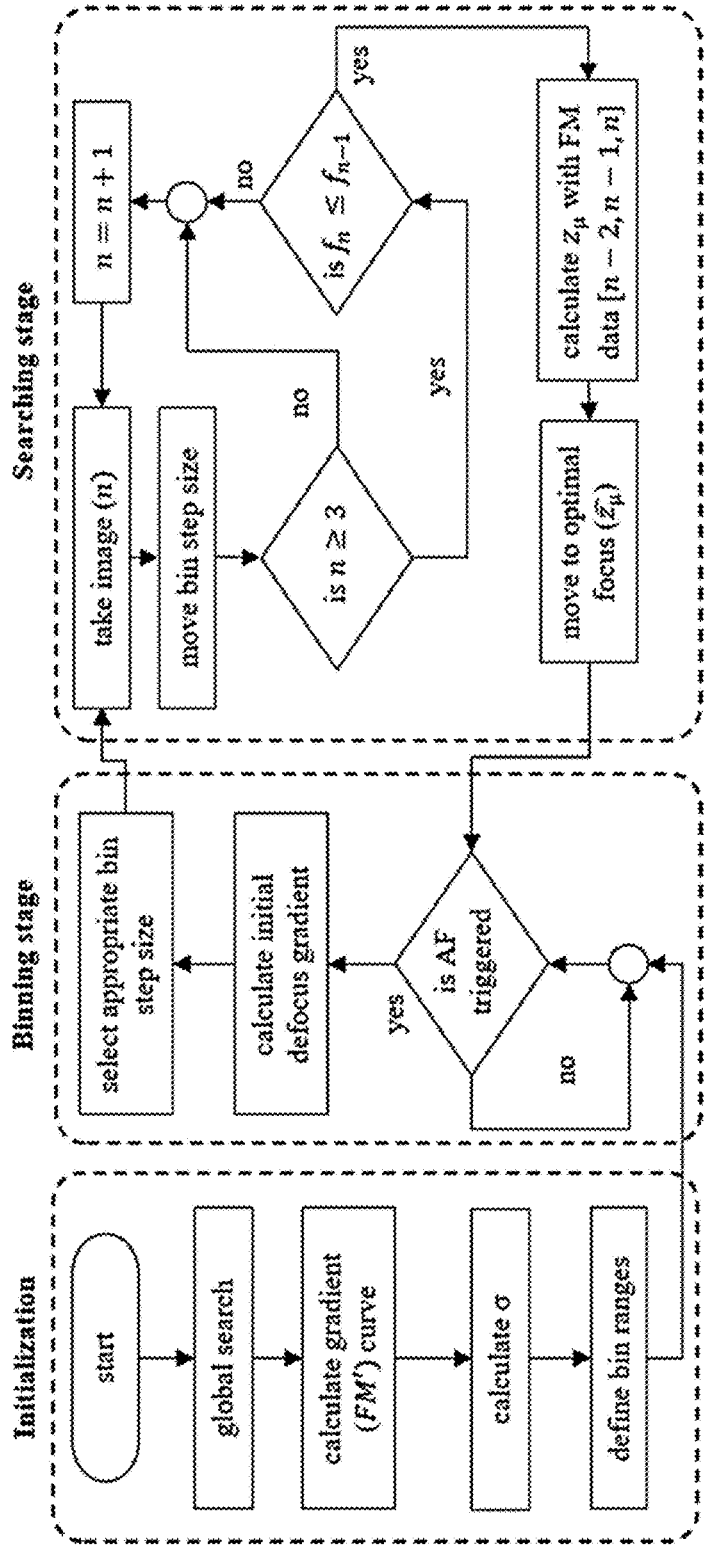
FIG. 6 illustrates an example of workflow of the proposed Gaussian standard deviation and gradient-based binning methodology, in accordance with various embodiments of the present disclosure.

If $\sigma$ of the FM curve is assumed to be invariant to position, the $\sigma$ of first order derivate of the Gaussian FM curve (FM') would also remain invariant to position, suggesting the approximate distance from $z_{n-2}$ to $z_\mu$ can be estimated via the FM' at $z_{n-2}$. Because the distance between $z_{n-2}$ and $z_\mu$ can be approximated solely on the value of FM' at $z_{n-2}$, gradient bins can be set at specific intervals to define a relationship between the local gradient and the step size needed to gather the ideal FM data. The value of FM' calculated via the difference between any two FM data at the beginning of AF serves as an excellent approximation to the Gaussian derivative and uses one fewer FM data than if the proper Gaussian derivative were used. The FM' calculated at the beginning of the AF can be categorized into a specified bin to return the necessary step size of the base scale $\sigma$. The minor influence from system noise by calculating FM' in this manner has the possibility of categorizing an initial defocused position into the incorrect gradient bin, which is experimentally visible as the mean number of FM data needed for N=32 AF experiments is slightly greater than the theoretical five. This influence can be minimized by increasing the length in which FM' is calculated over. The assumption of similar $\sigma$ values at various scales will be experimentally shown below. The specific gradient bins and their corresponding $\sigma$ step sizes are illustrated in FIG. 4A and defined in the table of FIG. 4B.

Figure 5:
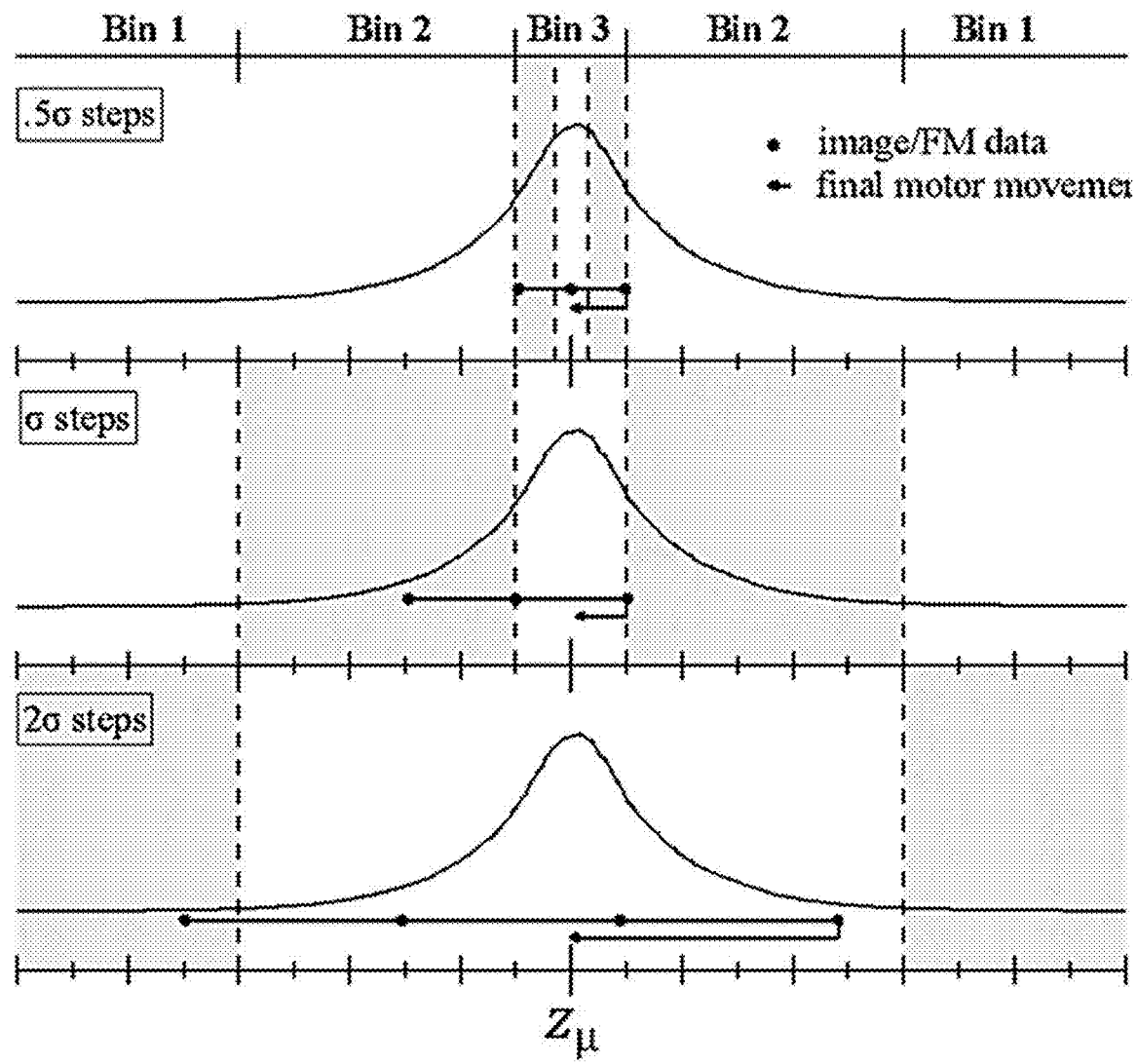
FIG. 5 illustrates an example of relating gradient bins and respective adapted σ-step sizes to the FM curve, in accordance with various embodiments of the present disclosure.

The intervals of the various gradient bins and their respective step sizes are selected such that three AF motions have a large probability of satisfying the condition of $f_n < f_{n-1}$. Local FM' values that categorize the initial defocus position into Bin 1 have a low probability of containing the optimal focus and thus large step sizes of $2\sigma$ are made in the direction of $z_\mu$ determined by the sign of FM'. Similarly, a local FM' value that categorizes the initial defocus position into Bin 2, is predetermined to be closer to the optimal focus and thus smaller step sizes of $1\sigma$ are used to minimize overshoot while still satisfying the same condition of $f_n < f_{n-1}$. A change in the plane of $z_\mu$, i.e., there is a new optimal focal plane located at $z_\mu$, can be modeled similar to a simple step input in control theory. A reduction in the overshoot of this parametric function will reduce the time to completion and thus is a main priority in the AF control process. The interval of Bin 3 is defined with the intention of having Bin 3 contain completely unique FM' values. If Bin 3 were to encompass the entire range of $-0.5\sigma$ to $0.5\sigma$ (i.e., the grey and white regions in FIG. 4A) the interval would not contain FM' values that are completely unique to Bin 3. This would pose limitations to the binning process as a single FM' value could be assigned to multiple bins and thus the initial defocused position could not be properly identified. To compensate for this, the interval is chosen so that Bin 3 excludes the depth of field (DOF) region (i.e., the region considered to be focused given the specified lens defined in FIG. 4A with grey). Defining the Bin 3 interval in this manner offers excellent experimental performance, as AF is not required in the DOF region and the DOF region can easily be identified by its large FM values. FIG. 5 illustrates the relationship between gradient bins and FM data with their respective adapted $\sigma$ step sizes.

From FIG. 5 it can be seen that certain initial defocused positions may not be able to meet the necessary condition of $f_n < f_{n-1}$ using only three FM data. To avoid this, step sizes defined by the specified gradient bin can be made until $f_n < f_{n-1}$. For instance, given the Bin 2, $\sigma$ steps region in FIG.

5, the condition of $f_n < f_{n-1}$ can be achieved with a minimum of three FM data and a maximum of four. Similarly, if the initial defocus position resides in the Bin 1, $2\sigma$ steps region in FIG. 5, there is a minimum of three FM data needed, and a maximum determined by the remaining defocus step positions in the working distance of the lens. Nevertheless, step sizes of $2\sigma$ from extreme levels of defocus provide an efficient path to the location of $z_\mu$ and still guarantee that at least two FM data will satisfy the necessary condition. All FM data (i.e., instances where three or more are collected to satisfy $f_n < f_{n-1}$) are displayed as the array, $$FM = \begin{bmatrix} f_{n-\infty} & \cdots & f_{n-2} & f_{n-1} & f_n \\ z_{n-\infty} & \cdots & z_{n-2} & z_{n-1} & z_n \end{bmatrix}, \quad (5)$$

where $f_n < f_{n-1}$ and $z_{n-2}$, $z_{n-1}$, $z_n$, $f_{n-2}$, $f_{n-1}$, $f_n$ are the GDER FM data used to directly calculate $z_\mu$.

Moreover, defining the gradient bins to be accurate and effective needs knowledge of the approximate Gaussian model that will be repeatedly navigated for the AF task chosen. Because both a and the gradient curves are assumed to remain constant. This model can be constructed through a simple global search conducted prior to AF. This global search takes FM data at every position in the working distance of the lens and calculates the approximate a value according to Eq. (4). Subsequently, the gradient of the FM curve is calculated, and the specific gradient bin intervals with corresponding FM' values are designated at the a locations mentioned previously. After this model has been constructed, fast and accurate AF control can be achieved. The workflow of the proposed Gaussian standard deviation and gradient-based binning method is detailed in FIG. 6.

Experimental Results

Figure 7B:
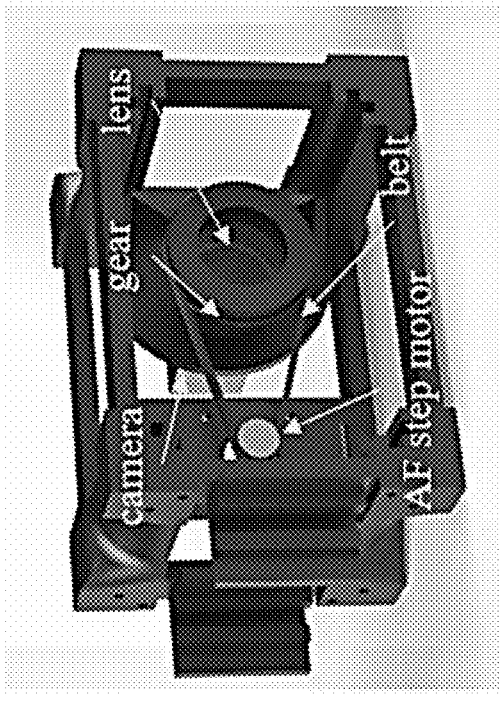
FIGS. 7A-7C illustrate an experimental setup and imaging acquisition hardware and control feedback loop, in accordance with various embodiments of the present disclosure.
Figure 7C:
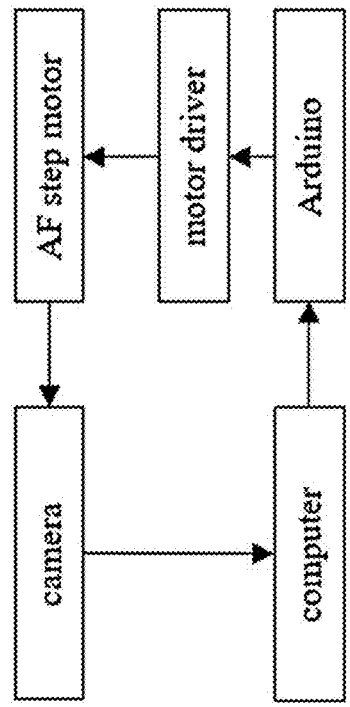
Figure 7A:
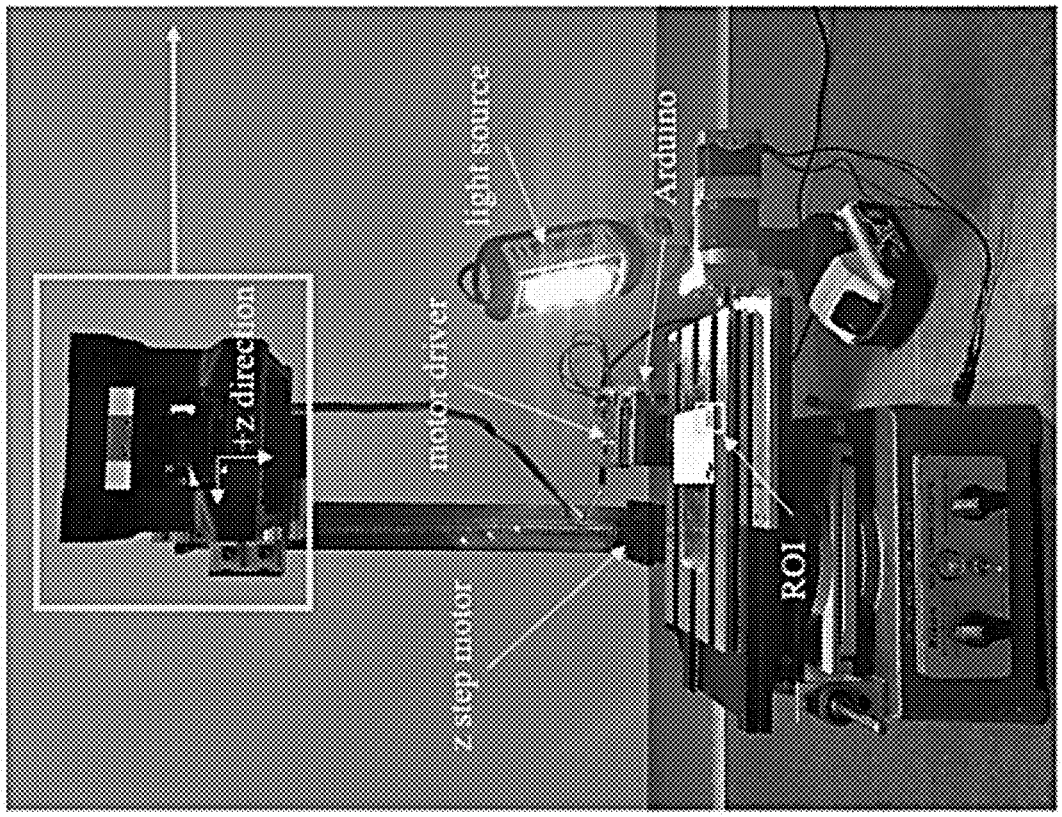

Experimental Setup. A system capable of housing hardware necessary for variable focus image acquisition was designed for evaluation of the proposed method. FIG. 7A is an image of the experimental setup. The selected hardware included: a Computar M2514-MP2 25 mm lens with working distance of 100-900 mm, Basler acA2040-120 µm 3.2 MP resolution mono USB 3.0 camera, Epson EM-293 step motor (AF step motor), and a 2 mm pitch gear and belt system responsible for changing the lens object distance. The Computar C-mount lens has a fixed focal length of 25 mm and an aperture range from F1.4-F16. FIG. 7B shows the 3D printed housing fitted with the selected image acquisition hardware.

The AF control of the image acquisition system (IAS) begins with a greyscale image taken by the camera. This image is sent to the computer via USB 3.0 where the GDER FMF calculates the current FM and outputs the next motor movement to the Arduino Uno. Using an Adafruit Motorshield V2 motor driver, the AF step motor will turn the 2 mm pitch gear and belt system to control the lens before another image is taken and the process is repeated. A single completion of this IAS feedback loop is responsible for one image, meaning the mean FM data acquired simply refers to how many of these IAS loops are needed to return a theoretically focused ROI. FIG. 7C shows the image acquisition control feedback loop of the IAS. Each AF method was programmed in a MATLAB R2019b environment with Intel Core i9-9900X CPU @ 3.60 GHz, NVIDIA GeForce RTX2080, and 64 GB of RAM.

AF time to completion is highly dependent on the distance between the initial defocused position and $z_\mu$ as motor movements are by far the greatest contribution to time. For this reason, devising an unbiased method for AF evaluation includes repeatedly introducing random levels of defocus to the IAS before AF. This was achieved by fixing the IAS via an aluminum extrusion to a 1979 Nikon Measurescope modified and fit with a Nema 17 step motor (z step motor in FIG. 7A) for autonomous z direction control. Changing the z position of the IAS to random positions between the minimum and maximum of the working distance of the lens ensures that all AF methods will be evaluated under similar initial defocused conditions. Prior to evaluation, a variety of targets were chosen to assess the robustness of each AF method to varying levels of ROI contrast. Under ideal lighting conditions, all three AF methods were evaluated for N=32 experiments using Images 1-3 from FIG. 8A, with a luminance of approximately 3500 lx measured with a Hioki Lux Meter. Additionally, the proposed GB algorithm was evaluated for N=32 experiments using Images 1-2, however this time, under low-light conditions measured at 450 lx as shown in FIG. 8B. The images of both FIGS. 8A and 8B are stills of size 350×350 pixels captured directly from a video at approximately 150 fps with 1900 µs exposure time. The results of the evaluation are discussed below with reference to the table of FIG. 11A.

Figures 9B, 10:
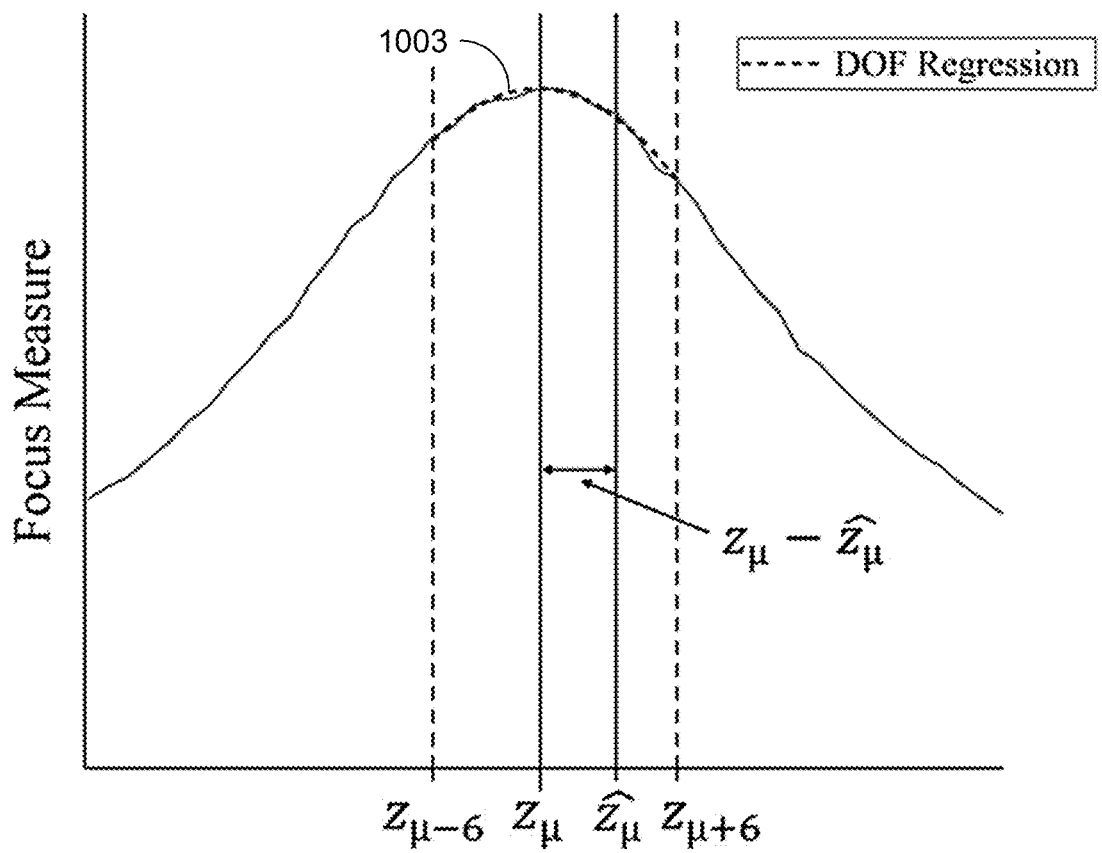

Focus measure curve standard deviation invariance. The concept of an adaptative step size based on the dispersion of the GDER FM curve, $\sigma$, operates under the assumption that $\sigma$ is invariant to position. The proposed method assumes unchanged ROI content during repeated AF (i.e., the relative amount of detail presented to the GDER FMF remains similar). As previously mentioned, if the ROI content remains the same, implying the same target is being imaged repeatedly at different planar positions (e.g., metrology, pattern analysis, microscopy), the physics of the lens itself is responsible for any variation in $\sigma$. This effect may be attributed to slight changes in the DOF at different object distances. These slight changes can ultimately influence the maximum clarity of the image presented to the GDER FMF and in turn, the u. Because the variation in $\sigma$ is minimal, this assumption was shown to be satisfactory throughout the experiments. It is important to note the limitations from needing to construct an assumed Gaussian model prior to AF. FIG. 9A visually shows the similarity between the GDER FM and FM' curves for Image1 shown in FIG. 8A. The table of FIG. 9B displays the u of Image1 with respect to different $z_\mu$ locations calculated using Eq. (4) and Eq. (3) respectively.

AF methods for comparative evaluation. In order to properly assess the speed and accuracy of the proposed algorithm, the proposed Gaussian Binning (GB) method was be directly compared to a fast and accurate Adaptive Hill-Climbing method (AHC). Traditional Hill-Climb methods are among the most popular rule-based methods used for AF control. These Hill-Climbing algorithms iteratively take photos along the FM curve at a specified interval and continually move in the direction of increasing FM values, stopping when it has arrived at a peak. This simple rule-based approach performs optimally in many situations, however, can converge to "false peaks." Furthermore, traditional Hill-Climb algorithms are an iterative process meaning many FM data are required creating long image processing times. The AHC method significantly improves upon the traditional rule-based Hill-Climbing methods through the introduction of an adaptive step size. This adaptive step size both reduces AF time by using fewer FM data and reduces the frequency of "false peak" convergences by minimizing the influence of system noise. The AHC's improvements to traditional Hill-Climbing regarding robustness and speed allows it to serve as an excellent industry standard for evaluating the proposed GB method.

Accurately assessing the performance of the proposed AF method also comprises a base-line comparison. As previously mentioned, Global Search methods (GS) are one of the most basic rule-based approaches to AF. GS methods utilize many FM data, are computationally expensive, and are extremely slow. GS methods do however demonstrate a general lower limit in terms of AF speed and accuracy and thus will serve as a base-line comparison to the AHC and GB AF methods.

Metrics for evaluation. The three AF methods were comparatively evaluated using the following metrics: RMSE, mean time to completion, and mean FM data acquired. The RMSE of the AF process is defined as $$RMSE = \sqrt{\frac{\sum_{i=1}^{N}(z_{\mu i} - \hat{z}_{\mu i})^2}{N}}, \quad (6)$$

where N is the number of repeated experiments, $z_{\mu i}$ is the ground truth location of the optimal focus and $\hat{z}_{\mu}$ is the final lens plane location, presented by the step motor position, for experiment i. Returning a focused image during the AF process implies that the final estimated optimal focus position of $\hat{z}_{\mu}$ resides within the DOF of the lens. The upper and $\hat{z}_{\mu}$ lower bounds of the DOF represented by $z_{\mu+6}$ and $z_{\mu-6}$ are displayed in FIG. 10. The Computar M2514-MP2 machine vision lens used for evaluation has a DOF of 25 mm which equates to approximately 12 step motor steps using the gear and belt system shown in FIG. 7B. Being able to consistently bring the image located at within the DOF range specified by the lens, implies a satisfactory AF experiment has been completed. Finding the location of $z_\mu$ after each successful AF experiment to calculate RMSE utilizes a small local search centered around the position of $\hat{z}_{\mu}$. For all experiments N, 15 steps bilateral to $\hat{z}_{\mu}$ was sufficient to obtain $z_\mu$ in the local search of the FM curve. From there, a finer $z_\mu$ was calculated via a Levenberg Marquardt regression using only the FM data located in the DOF (the dashed line 1003 in FIG. 10). This small regression removes slight variations due to system noise that might otherwise shift the location of the legitimate $z_\mu$. FIG. 10 illustrates the post-AF local search FM data, DOF bounds and regression, as well as the estimated, $\hat{z}_{\mu}$, and ground truth, $z_\mu$, optimal focus positions.

The mean time to completion simply refers to the average time from initial defocused z position to completion of the final motor movement at $\hat{z}_{\mu}$ given N AF experiments (e.g., after final motor movement in FIG. 5).

The mean FM data acquired refers to the average number of images processed given N AF experiments. This number equates to the average number of completions of the image acquisition system feedback loop (shown in FIG. 7C) needed to arrive at $\hat{z}_{\mu}$. This metric quantifies both the computational cost as well as power consumption and thus should be minimized.

Results and Discussion. The table of FIG. 11A compares the proposed novel GB method against the AHC and baseline GS methods for Images1-3 in ideal lighting conditions. The table of FIG. 11A also includes an average of performances across all ideal lighting experiments.

The proposed AF methodology outperforms the GS and AHC methods in both mean FM data acquired and mean time to completion, while still offering satisfactory RMSE for all targets. The inclusion of an adaptive step size based on the σ of the FM curve estimated via gradient derivative binning, reduced the images needed for AF by approximately 80% as well as focus time by 22% when compared to the leading AHC method. Furthermore, the proposed AF methodology offered similar performance in low-light conditions while still maintaining sufficient accuracy as measure by RMSE. The GB method was also proven to be robust to low-light conditions as shown by the results from low-light testing displayed in the table of FIG. 11B. The AF methodology utilizes far fewer images and shorter focus times than the AF algorithm proposed in "Fast and accurate autofocusing algorithm based on the combination of depth from focus and improved depth from defocus" by Zhang et al. (Opt. Express 22(25), 31237, 2014).

Figure 12:
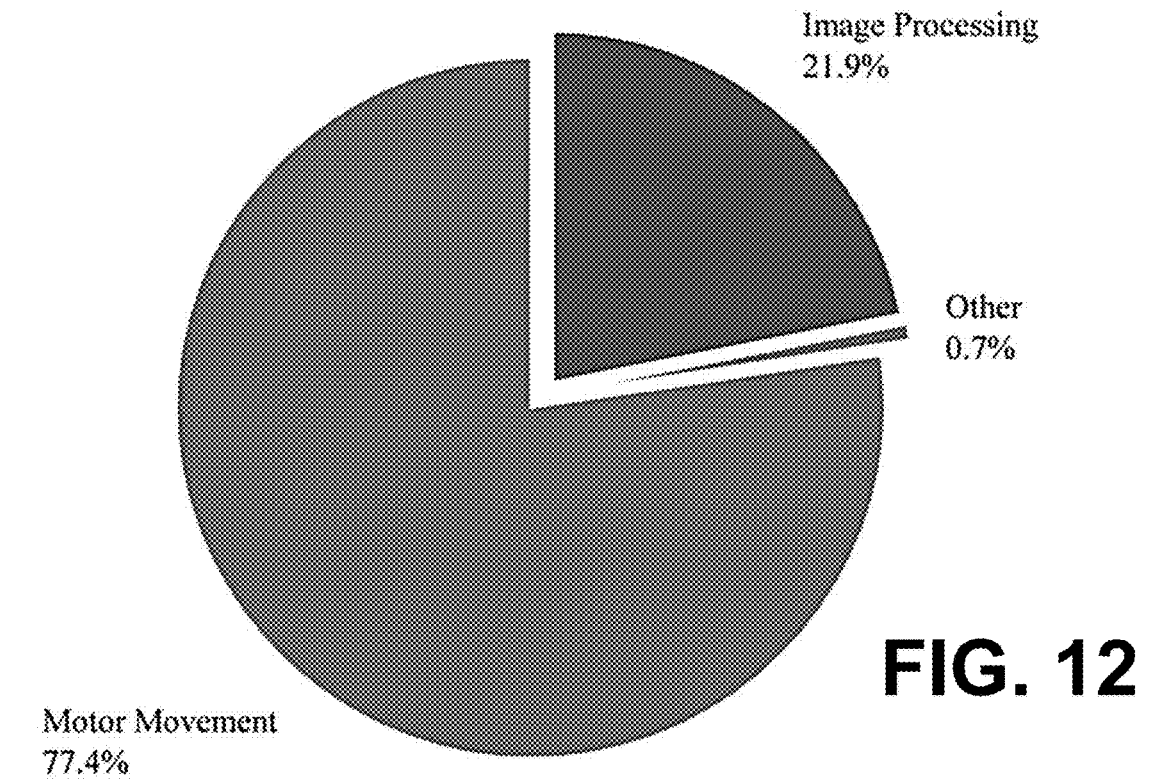
FIG. 12 illustrates a breakdown of AF time to completion by image processing time and motor movement time for the GB AF methodology, in accordance with various embodiments of the present disclosure.

From the results displayed in the table of FIG. 11A, it can be seen that the total AF time is reduced by 22% after using GB to replace the AHC method, but the mean number of FM data acquired decreases by 80%. The experiment's hardware, including the lens driver structure of stepper motor and belt, creates the bottleneck of this AF system regarding focus time. From FIG. 12 it can be seen that 77.4% of the overall GB method's AF time is attributed to the AF step motor. For an AF time of 500 ms, the motor movement time will contribute to 387 ms. Therefore, improvement can be obtained using upgraded hardware to evaluate an AF algorithm that is as fast as the proposed GB method. For example, the stepper motor can be upgraded to a faster driver, e.g., piezo driver. The piezo driver only takes 3.3 ms for a full range movement. A driver this fast will reduce the motor motion time to less than 1% of the experimental AF step motor in this disclosure.

A relationship between the FM curve standard deviation and the working distance of the AF system has been established in the disclosure. It was theorized that the σ describing the dispersion of the FM curve would be invariant to position. As shown in the table of FIG. 9B, σ remains similar with respect to $z_\mu$. The slight variation in σ may be attributed to the physics of the lens system at different object distances. A novel method using FM' binning was devised to get a suitable step size according to the base scale σ of the FM curve. By using this adaptive step size, the number of images needed for AF can be minimized. At the same time, an innovative direct calculation for the location of the optimal focus for the algorithm was disclosed. By using this innovative method, the image processing time can be reduced dramatically. By comparing the GB method with the baseline GS method and the AHC method, it was proven that the proposed methodology provides significant advantages regarding the necessary number of processed images required to AF. Furthermore, the proposed method has been shown to be robust to both well-lit and low-light conditions.

With an upgrade of the driving technology, the GB method can provide an even greater benefit regarding AF time due to the fewer number of images required for AF. Faster lens motion can provide even greater advantages regarding AF time when comparing the proposed GB method to the AHC method. Moreover, the Gaussian model, its standard deviation, and respective binning limits may be inferred from a single defocused image in accordance with scale-space theory. Using high and low frequency information present in the ROI content, artificial intelligence may be introduced to construct the initial Gaussian model.

LSTM-Based Model Predictive Control of Piezoelectric Motion Stages for High-Speed Autofocus The discovery of the piezoelectric effect in 1880 by Pierre and Paul-Jacques Curie, piezoelectric motion has enabled a variety of high-precision positioning technologies. Piezoelectric actuators (PEAs) can achieve high resolution and precision at micro and nanometric scales with very fast responses and bandwidth ranges in the order of kHz. As a result, they are an excellent option for AF applications. In fact, PEAs, or similarly piezoelectric motion stages (PEMSs), are the key devices in micro-optical positioning systems such as the scanning electron microscope, atomic force microscopy, compact two-dimensional single-mirror laser scanner, and the micro focusing mechanism.

Despite PEMSs being at the forefront of precision, their performance is burdened by nonlinearities which make their applications in AF a challenge. Like many ferromagnetic and ferroelectric devices, PEMSs exhibit hysteresis which is a dominant nonlinear characteristic in the dynamics of the PEMS. This phenomenon is responsible for making the corresponding displacement curves in the voltage lift and return intervals not overlap. The hysteresis seen in piezoelectric materials significantly compromises the control accuracy of PEAs or PEMSs, thus greatly limiting their applications in micro-displacement technology. Thus, traditional PEMS applications for AF first employ an internal controller that overcomes the hysteresis and achieves deterministic positioning control. Subsequently, the PEMS is applied with the embedded controller for further AF applications as conceptually illustrated in FIG. 13A. The conventional way of designing the internal controller is to automatically adjust the input by utilizing some form of closed-loop control.

Piezoelectric Motion Stage Control. Closed-loop controllers have been introduced to remove these issues by involving another loop that acquires position information, essentially bridging the gap between the input voltage and absolute position. For example, a robust $H_\infty$ controller can be designed to control a large range nano-positioner actuated by PEAs. Alternatively, an adaptive fuzzy sliding mode control can be developed for piezo-actuated flexure-based micro/nano manipulators. Several NN-based closed-loop control algorithms have also been developed for positioning control of PEAs. Overall, closed-loop control systems are necessary if nm or μm tolerances are needed for high precision positioning. However, precise closed-loop positioning of a PEMS is far slower than open-loop alternatives and comes with the additional cost of fast and precise displacement sensors for position feedback. For these reasons, open-loop control techniques are preferred.

Open-loop controllers offer faster rise times and sharper impulse responses for more rapid transitions in dynamics. The most popular approach of open-loop control design for PEMS is the inversion-based feedforward control. To cope with the hysteresis effect when using an open-loop control technique, a model is first selected to describe the hysteresis, and then a feedforward controller is designed to compensate for the hysteresis effect. Several physics-based models have been proposed to learn the hysteresis effect of PEAs, including a Preisach model and a Prandtl-Ishlinskii model. Although the open-loop control saves the cost of installing displacement sensors, the design of the feedforward controller needs the inverse of the hysteresis model which is computationally nontrivial. The calculation of the inverse hysteresis model is either time consuming or lacks accuracy. Thus, even though open-loop control is highly sought after for PEMS positioning control, the nonlinearity of the hysteresis makes it difficult to obtain an accurate invertible physical PEMS model, preventing the controller from providing accurate inputs to the PEMS.

Another difficulty in PEMS applications is the unwanted vibrations of the piezoelectric elements caused by the impulse inputs. Several solutions have been proposed to eliminate the vibrations. For example, the vibrations can be modeled as a linear dynamical model and then a feedforward controller designed accordingly to compensate for the vibrations. The vibrations can also be compensated by applying the Zero Vibration input shaping technique.

In this disclosure, an end-to-end control algorithm is disclosed for PEMS which uses LSTM to directly link the open-loop PEMS input voltage to the response variable, and subsequently uses a single model-predictive controller for complete system control. Using an LSTM-based MPC scheme has the potential to reduce the complexity of the control system while still providing fast and accurate responses to the PEMS. In addition, a simple S-curve input profile capable of reducing the piezoelectric jitter that follows a step input is introduced.

Autofocus. Classic AF methods can be broadly divided into two categories, active and passive. Active AF methods use a sensor (e.g., laser) to measure the distance between the camera and target and subsequently adjust the optical system to correct the focus. Active AF methods attempt to remove limitations surrounding focus accuracy that can arise with varying image content (e.g., low-contrast imaging or low-light conditions). Active AF methods offer superior performance in stationary imaging scenarios, such as microscopy, because the subject always resides in a position where its distance to the camera can be repeatedly measured. If the distance of the subject is unknown or unable to be measured, passive methods can be employed. Rather than using additional sensors, the objective of the classic passive AF processes is to autonomously navigate from a defocused image to a focused one by employing various rule-based search algorithms to maximize the measured focus. Within the passive AF category, the phase-based and deep learning-based methods are regarded as state-of-the-art. Phase-based methods can be employed on specially designed camera sensors where each pixel consists of two independent photodiodes. Rule-based control methods or deep learning algorithms can be implemented to estimate subject depth from the difference in phase of the stereo images, thus enabling fast autofocus or even detailed depth maps for facial recognition. Phase-based methods offer superior AF to traditional passive methods regarding speed; however, these methods can significantly increase the cost and complexity of the image acquisition system (IAS).

Inspired by the successful application of deep learning in computer vision tasks, such as image classification, image segmentation, and image super-resolution, various training-based AF methods have been proposed to outperform the phase-based AF methods. For example, a convolution LSTM (ConvLSTM) framework with a feature detector, object detector, and focus step predictor may be used to provide the capability of focus tracking. Also, a convolutional neural network (CNN)-based step estimator and focus discriminator can be used to provide the capability of single-shot AF. A passive AF control system can be developed using a trained self-organizing map (SOM) neural network to predict the optimal lens position using the focus score from three initial images.

Figure 13A:
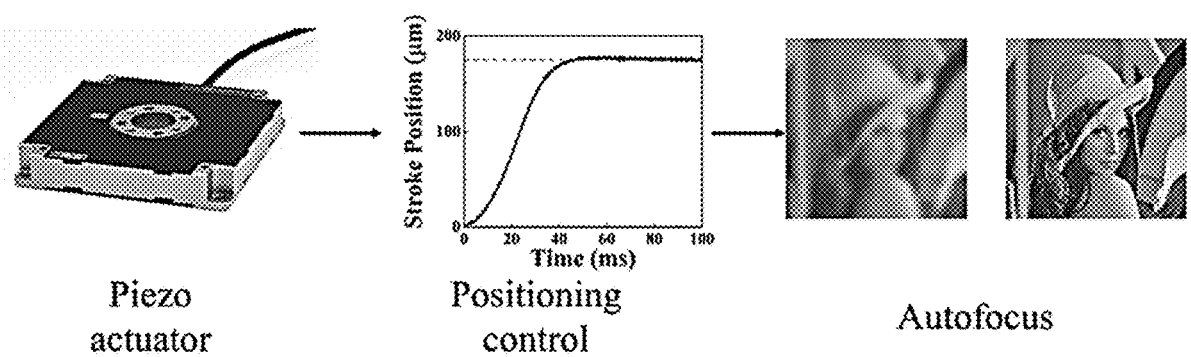
FIGS. 13A and 13B illustrate examples of classic AF and proposed high-speed AF, in accordance with various embodiments of the present disclosure.
Figure 13B:
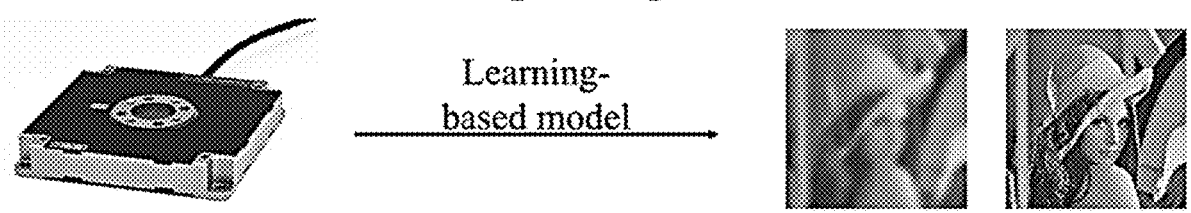

Based upon the application of neural-network (NN)-based model predictive control (MPC) for high performance in nonlinear precision motion control fields. an alternative PEMS AF control solution can integrate the defocus measurements and the hysteresis effects of the PEMS accurately in a single learning-based model, as shown in FIG. 13B. This solution avoids the need for a slower internal position controller before AF control as shown in FIG. 13A. The use of LSTM is proposed to link the open-loop PEMS input voltage to the level of focus. Rather than using a single image as input to the LSTM, a sequence of focus scores can be used as the inputs. There are two advantages of designing the inputs in this way: the first being that the sequential inputs could capture the high-order and delayed-response modes of interaction, and the second using the focus scores as the inputs can remove image-based dependencies.

The solution is based on the hypothesis that the nonlinear dynamics information, including the hysteresis, is embedded in the sequence of focus/defocus images during the AF process. Therefore, the dynamic non-linearities and the AF process can be learned or inferred using the image data from both offline and in situ measurements in an NN-based MPC architecture. The input data to the NN includes focus scores extracted from sequential focus/defocus images. From the sequential focus scores, the state of the focus or defocus can be inferred and the motion step needed to bring the lens to the optimal focus position ascertained. For PEMS, since most of its non-linearities result from the hysteresis, i.e., the dependence of the state of a system on its history, it is then appropriate to use long short-term memory (LSTM) to model PEMS. The LSTM architecture retains the state information from previous observations thus allowing it to infer the non-linear dynamics of the PEMS. To further improve the speed of the LSTM-based MPC control loop while maintaining sufficient accuracy, an optimized LSTM backpropagation algorithm is presented that reduces the number of redundant calculations during the AF process. Moreover, to cope with the vibrations from the rapid PEMS impulse inputs, a unique S-curve control input profile is designed to reduce the acceleration profile and promote a more stable transition in dynamics and ultimately improve the accuracy of our LSTM-based MPC AF control scheme. Experiments were carried out to test the proposed AF method. Contributions of the LSTM-based MPC can include, e.g., open-loop control of a PEMS using LSTM to identify the system dynamics, LSTM deep learning and MPC for AF using a sequence of focus scores to predict the optimal focus position, optimized LSTM backpropagation algorithms, S-curve profile for PEMS input to reduce piezoelectric element jitters and/or an autofocus control loop rate of 40 Hz.

LSTM-Based Model Predictive Control

A learning-based method can be used to directly link the PEMS inputs to the output focus score. Specifically, the control input to the system is denoted as u(t) which defines the input voltage applied to the PEMS at time t. The response variable of the system is a scalar, y(t), which describes the focus measurement of the image. Aiming to achieve high-speed autofocus, the priority when selecting the focusing function is the computational complexity; while the accuracy falls second. 28 different focus measure functions were tested and the maximum absolute gradient (MAG) method having the fastest calculation speed of 6 ms was selected. The MAG method used to calculate the FM score F is defined as $$F = \frac{1}{NM} \sum_{x=1}^{M} \sum_{y=1}^{N} \max(|I_x|, |I_y|, |I_d|), \tag{7}$$

where $I(x, y)$ is the image gray value at the pixel coordinate $(x, y)$ in an image of size M×N, $I_x$, $I_y$, and $I_d$ are respectively the gradients in the x, y, and diagonal direction defined respectively by $I_x=I(x, y)-I(x+1, y)$, $I_y=I(x, y)-I(x, y+1)$, and $I_d=I(x, y)-I(x+1, y+1)$.

The non-linearity introduces both position uncertainty and piezoelectric jitter, which can lead to large errors in the AF actuator movements. To elaborate, the total stroke of a nano-resolution PEMS (e.g., Piezosystem Jena Inc. nanoSX 400 S CAP) under open-loop control is 503.9 μm with maximum hysteresis of 60.03 μm as shown in FIG. 14A. This introduces a potential 12% position uncertainty to the medium which controls a high-mass IAS within a depth of field (DOF) range of 3.2 μm. Because the uncertainty is approximately 15-20 times larger than the DOF, AF accuracy of industrial standards in vanilla open-loop control is virtually unattainable. Moreover, the residual vibrations of the piezoelectric elements lengthen the settling time of the open-loop response to greater than 40 ms as shown in FIG. 14B, thus removing any possibility of real-time optical metrology. As a result, there exists a need for a solution to the hysteresis and vibration non-linearity of PEMSs to enable fast and accurate optical-positioning-based metrology techniques.

Structure of LSTM. There are various deep learning models with different structures to model an unknown non-linear system. To model the inputs to the PEMS and the output focus scores, as most of the non-linearities result from the hysteresis, i.e., the dependence of the state of a system on its history, it would be appropriate to use a recurrent neural network (RNN). However, the standard RNN models lack long-term dependencies of the state due to the gradient vanishing problem. Hence, LSTM can be used to model PEMS for AF.

In an LSTM network, the past information can be stored in a memory cell and four gates can be used to control the flow of information into or out of the memory cell, namely, the input gate i, forget gate f, output gate o, and the candidate gate g. Mathematically, the calculations in the LSTM model at time step t can be described as follows, $$i(t)=\sigma(W_{xi}x(t)+W_{hi}h(t-1)+b_i), \tag{8a}$$

$$f(t)=\sigma(W_{xf}x(t)+W_{hf}h(t-1)+b_f), \tag{8b}$$

$$o(t)=\sigma(W_{xo}x(t)+W_{ho}h(t-1)+b_o), \tag{8c}$$

$$g(t)=\tan h(W_{xg}x(t)+W_{hg}h(t-1)+bg), \tag{8d}$$

$$c(t)=f(t)\odot c(t-1)+i(t)\odot g(t), \tag{8e}$$

$$h(t)=o(t)\odot\sigma(c(t)), \tag{8f}$$

$$y_p(t)=Wh(t)+b, \tag{8g}$$

where $x \in \mathbb{R}^{n_x \times 1}$ is the input vector, $y_p \in \mathbb{R}^{1 \times 1}$ is the predicted focus measurement, $h \in \mathbb{R}^{n_p \times 1}$ is the hidden state, $c \in \mathbb{R}^{n_p \times 1}$ is the cell state, $W_{xi} \in \mathbb{R}^{n_p \times n_x}$, $W_{xf} \in \mathbb{R}^{n_p \times n_x}$, $W_{xo} \in \mathbb{R}^{n_p \times n_x}$, and $W_{xg} \in \mathbb{R}^{n_p \times n_x}$ are the weights from the inputs. Similarly, $W_{hi} \in \mathbb{R}^{n_p \times n_p}$, $W_{hf} \in \mathbb{R}^{n_p \times n_p}$, $W_{ho} \in \mathbb{R}^{n_p \times n_p}$, and $W_{hg} \in \mathbb{R}^{n_p \times n_p}$ are the weights from the hidden states. $b_i \in \mathbb{R}^{n_p \times 1}$, $b_f \in \mathbb{R}^{n_p \times 1}$, $b_o \in \mathbb{R}^{n_p \times 1}$ and $b_g \in$ $\mathbb{R}^{n_p \times 1}$ are biases for different gate states. $W \in \mathbb{R}^{1 \times n_p}$ and $b \in \mathbb{R}^{1 \times 1}$ are the weight and the bias for the output layer, respectively. $\odot$, $\sigma$, and tan h are respectively the element-wise multiplication operator, logistic sigmoid function, and hyperbolic tangent function. For the input features to the LSTM, both inputs and outputs from the plant are concatenated to capture the short-term input-output responses. Rather than considering only one single timestep, a sequence of input-output pairs, like $x(t)=[u(t), u(t-1), \ldots u(t-n_u), y(t-1), y(t-2), \ldots y(t-n_y)]$ will be used as the input feature vector to capture the delayed-response modes of interaction, where $n_u$ and $n_y$ are respectively the exogenously designated time delays of the input and output.

LSTM-Based MPC. The MPC can calculate control commands by minimizing a cost function over a finite prediction horizon. The cost function can be formulated by minimizing not only the squared error between the reference signal and the plant's output but also the weighted squared change of the control input. Given the LSTM architecture for the dynamic plant model, the MPC cost function can be formulated by $$J_{MPC} = \sum_{j=1}^{P} \|y_r(t+j) - y_p(t+j)\|^2 + \sum_{j=1}^{M} \lambda(j)\|\Delta u(t+j)\|^2, \quad (9)$$

where P is the prediction horizon, M is the control horizon, $y_r$ is the reference signal, $y_p(t+j)$ is the predicted output of the LSTM at the $(t+j)^{th}$ period based on the available measurements at the $t^{th}$ sampling period, $\lambda(j)$ is the regulating factor for the control input that maintains the smoothness of the control signal and can be chosen to be constant or exponential, and $\Delta u(t+j)=u(t+j)-u(t+j-1)$ denotes the change in u.

The objective of the cost function minimization algorithm is to minimize $J_{MPC}$ in Eq. (9) with respect to $[u(t+1), u(t+2), \ldots, u(t+M)]$, denoted by U. Since the plant model is an LSTM structure, a gradient descent method can be used to minimize the cost function iteratively. During each iteration, the intermediate value for $J_{MPC}$ is denoted by $J_{MPC}(k)$. Meanwhile, the generated intermediate control input is denoted by U(k) allowing the control input to be updated according to, $$U(k+1) = U(k) + \Delta U(k), \quad (10)$$

$$\Delta U(k) = \eta\left(-\frac{\partial J_{MPC}(k)}{\partial U(k)}\right), \quad (11)$$

where $\eta > 0$ is the update rate for the control input. The Jacobian matrix is then denoted as $$\frac{\partial J_{MPC}}{\partial U}(k) = \begin{bmatrix} \frac{\partial J_{MPC}}{\partial u(t+1)} \\ \ldots \\ \frac{\partial J_{MPC}}{\partial u(t+M)} \end{bmatrix} \quad (12)$$

and the $h^{th}$ element of the Jacobian matrix in Eq. (12) is stated as $$\frac{\partial J_{MPC}}{\partial u(t+h)} = \quad (13)$$

$$-2\sum_{j=1}^{P}[y_r(t+j) - y_p(t+j)]\frac{\partial y_p(t+j)}{\partial u(t+h)} + 2\sum_{j=1}^{M}\lambda(j)[\Delta u(t+j)]\frac{\partial \Delta u(t+j)}{\partial u(t+h)}$$

The $$\frac{\partial \Delta u(t+j)}{\partial u(t+h)}$$

term can be expanded and calculated in terms of the Kronecker Delta function $$\frac{\partial \Delta u(t+j)}{\partial u(t+h)} = \frac{\partial u(t+j)}{\partial u(t+h)} - \frac{\partial u(t+j-1)}{\partial u(t+h)} = \delta(h, j) - \delta(h, j-1)$$

where $$\delta(h, j) = \begin{cases} 1 \text{ if } h = j \\ 0 \text{ if } h \neq j \end{cases}.$$

For the $$\frac{\partial y_p(t+j)}{\partial u(t+h)}$$

term, as it is modeled by the LSTM, it is then feasible to calculate the derivatives through the backpropagation algorithm. The convergence of the backpropagation algorithm is highly dependent upon the iteration number and the updating rate. Generally, a fast backpropagation algorithm often provides flexibility in tuning the iteration number and the updating rate. The Backpropagation Through Time (BPTT) algorithm has been widely implemented by researchers to solve the Jacobian matrix in the training of LSTM networks. However, the vanilla BPTT algorithm is not suitable in the calculation of Eq. (12). If a vanilla BPTT algorithm is used to calculate the gradient following Algorithm 1 of FIG. 15A, it can be found that in the forward pass of the 'while' loops, the hidden states and the cell states are calculated multiple times, which affects the computation time in two aspects. First, the size of the hidden and cell states is incrementally increased adversely affecting performance and memory use as repeatedly changing sizes requires the system to allocate more time for seeking larger contiguous blocks of memory. Second, some elements in the hidden and cell states are calculated multiple times. Specifically, the elements in the $i^{th}$ row of the hidden states and the cell states will be calculated P−i+1 times. These redundant operations slow down the gradient calculation. To expedite the gradient calculation, the vanilla BPTT method was improved based on pre-allocation as shown in Algorithm 2 of FIG. 15B (in pseudo-code of MATLAB-style). The improved BPTT algorithm was shown to save 20% of the computation time as will be detailed.

After applying Algorithm 2, the derivatives of $$\frac{\partial y_p(t+i)}{\partial x(t+j)},$$

i∈[1, P], j∈[1, i] are stored in system memory and the next step is to calculate the derivatives of $$\frac{\partial y_p}{\partial U}.$$

The algorithm for calculating $$\frac{\partial y_p}{\partial U}$$

is accomplished by applying the chain rule through time as shown in Algorithm 3 of FIG. 15C. Note that as the stability analysis of the NN-based MPC scheme is well established in published literature, it is not included here.

Experimental Results

Figure 16B:
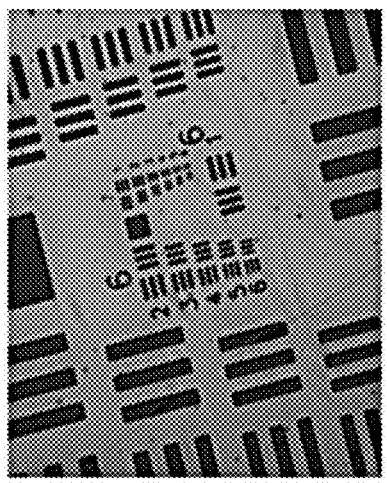
FIGS. 16A-16C are images of examples of an image acquisition system of the experimental setup, a US Air Force Hi-Resolution target, and a circuit target, in accordance with various embodiments of the present disclosure.
Figure 16C:
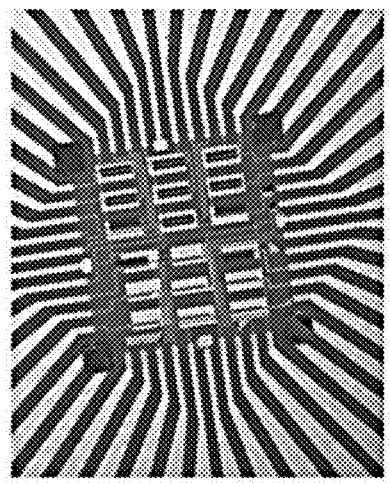
Figure 16A:
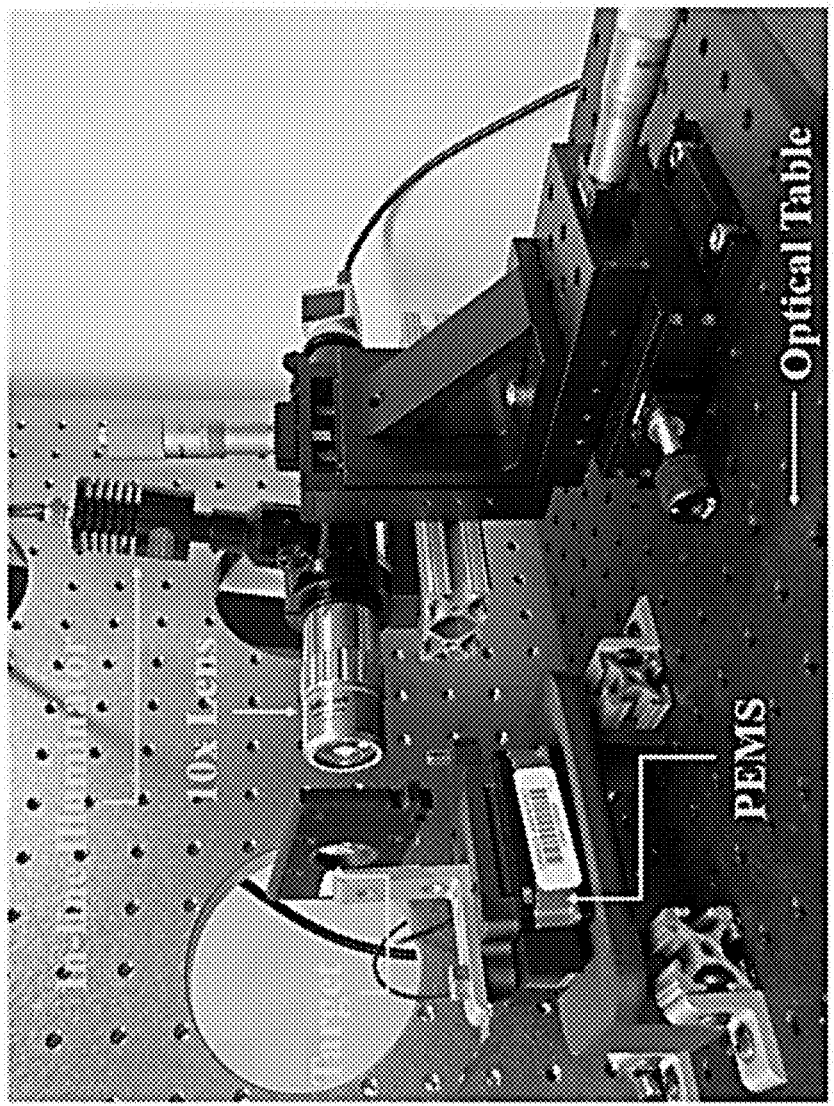
Figure 17:
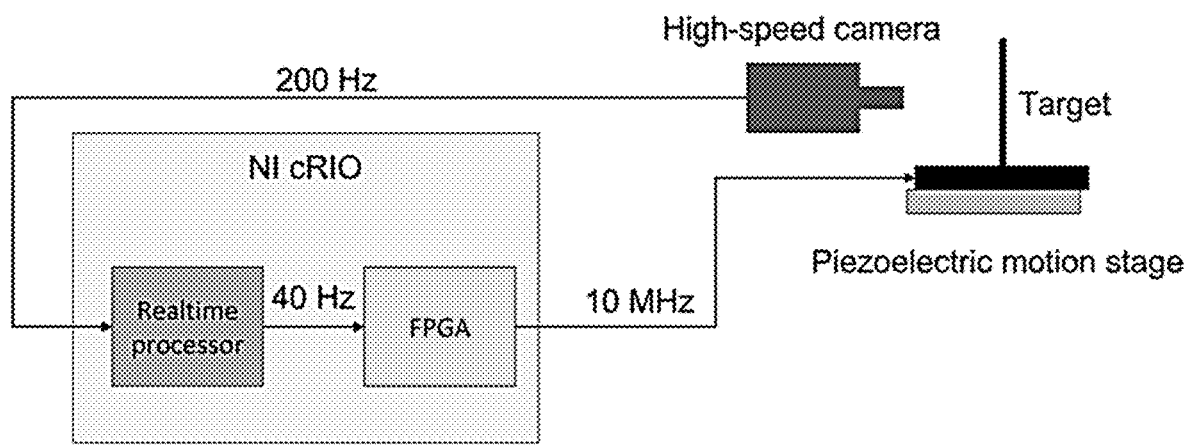
FIG. 17 is a schematic diagram illustrating an example of the experimental setup, in accordance with various embodiments of the present disclosure.

Experimental Setup. Referring to FIG. 16A, shown is the experimental setup which includes the PEMS (e.g., piezo-system jena Inc. nanoSX 400 S CAP), AF target, controller, optical table, and stationary 10×lens IAS. The IAS comprises a high-speed CMOS area-scan camera, a 3D printed adaptor, a lighting source, a coaxial in-line illuminator unit, and a high magnification factor objective lens. FIGS. 16B and 16C show examples of targets used for testing. FIG. 17 displays the experimental control schematic which includes the high-speed camera (Basler acA1300-200 um) connected to a real-time controller (e.g., CompactRIO-9049, National Instruments) via USB 3.0. The processing circuitry for the controller can include a processor, memory, FPGA, etc. This camera has a maximum resolution of 1280×1024 pixel$^2$ and a maximum frame rate of 200 fps for the full frame. The LSTM-based MPC algorithm is run in the real-time processor of the controller then the output command is sent to the PEMS via Field Programmable Gate Arrays (FPGA) with a communication speed of 10 MHz.

Figure 18A:
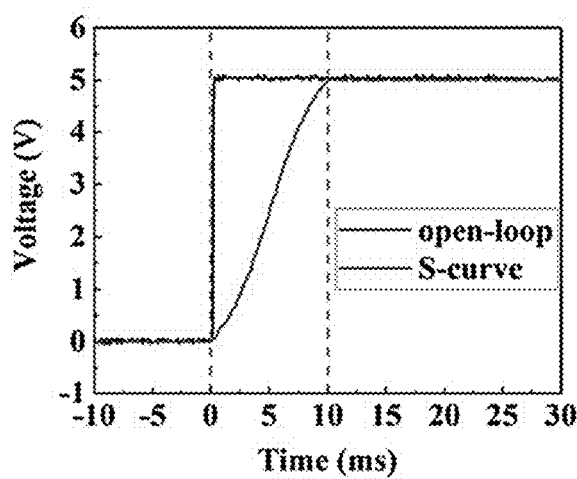
FIGS. 18A and 18B illustrate examples of open-loop and S-curve step inputs, and open-loop and S-curve step input responses, in accordance with various embodiments of the present disclosure.

The PEMS used in the experiment has two operation modes, e.g., a closed-loop mode and an open-loop mode. When operating the PEMS using the closed-loop control mode, the rise time of a full stroke takes 50 ms compared to the open-loop control mode which takes 3 ms. Therefore, for a fast operation speed, the open-loop control mode is preferred. However, in the vanilla open-loop control mode, the S-curve acceleration profile is not followed and motor jerk is accentuated. FIG. 18A illustrates the open-loop step input with respect to the S-curve input. To reduce the motor jerk, a method of generating S-curve motion profiles is introduced that abide by the following equation, $$y = p_1 + (p_2 - p_1)\left(0.5 + 0.5\left(\frac{t}{\sqrt{(1.5 + t^2)}}\right)\right), \quad (14)$$

$$p_1 = \frac{V_i}{0.833} - \frac{V_r}{4.992}, \quad (14a)$$

$$p_2 = \frac{V_r}{0.833} - \frac{V_i}{4.992}, \quad (14b)$$

where $V_i$ is the starting voltage, $V_r$ is the reference voltage, t is the time window of the S-curve profile, and y is the interpolated voltage. In the experiments, the time window was selected to be 10 ms. The 10 ms S-curve acceleration profile was divided into 1000 steps at a resolution of 0.3 mV.

Figure 18B:
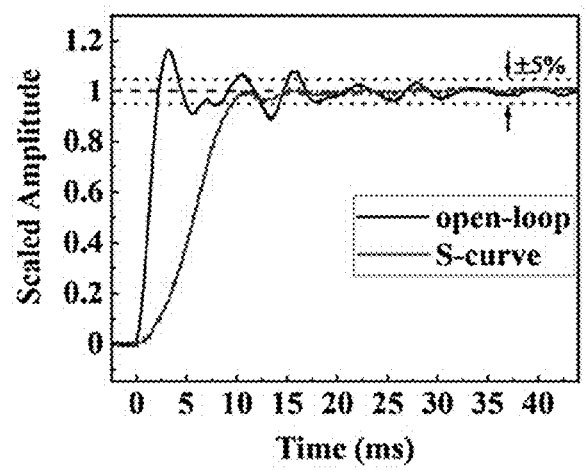

The comparison between the open-loop mode step input response versus the S-curve step input response is shown in FIG. 18B. Using the S-curve profile the settling time was reduced to 9.6 ms, which is 15 ms less than the vanilla open-loop mode regarding the traditional 5% error band.

Training of LSTM. The state-of-the-art literature uses images as the input to the NN; however, the features in each image can vary drastically by scene. For the method to be robust enough to generalize to new scenes, large datasets are needed to train the NN. With the aim of removing any image-based dependencies, the proposed method can be generalized by opting to use a scalar focus score as the input to the LSTM.

Figure 19A:
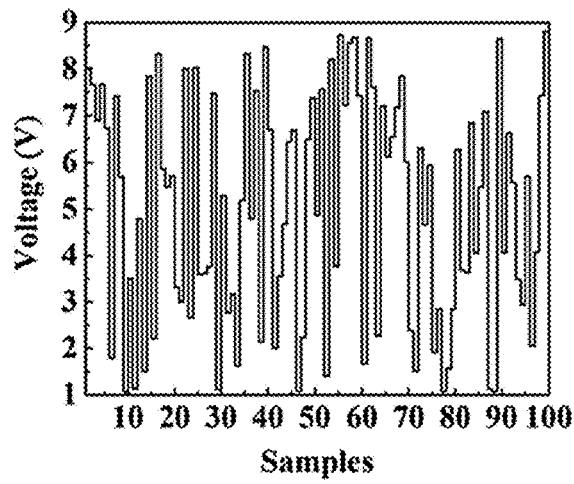
FIGS. 19A and 19B illustrate examples of rectangular pulse train used as the input to the PEMS and response of the PEMS to the pulse train input, in accordance with various embodiments of the present disclosure.
Figure 19B:
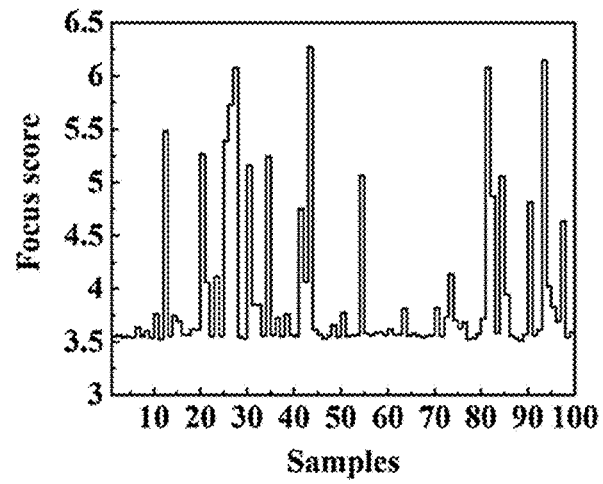

To capture the dynamics between the input to the PEMS and the output focus score, a pulse-train method can be used to generate the training dataset on the US Air Force Hi-Resolution target as shown in FIG. 16B. FIG. 19A shows the series of pulses with random amplitudes and FIG. 19B shows the resultant focus scores from these pulses. Each pulse lasts 15 ms, equal to the same time as the PEMS movement in the control loop. To sufficiently span the working space of the PEMS, 10,000 samples are generated with the input voltages to the PEMS uniformly randomly selected in the range of [1V, 9V]. In this experiment, 80% of the data was used for training and 20% was used for testing.

Figure 20A:
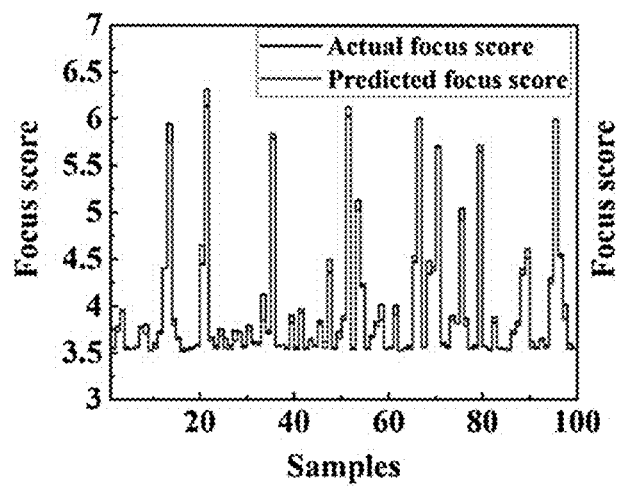
FIGS. 20A and 20B illustrate examples of actual and predicted focus scores of the testing dataset, and corresponding error, in accordance with various embodiments of the present disclosure.
Figure 20B:
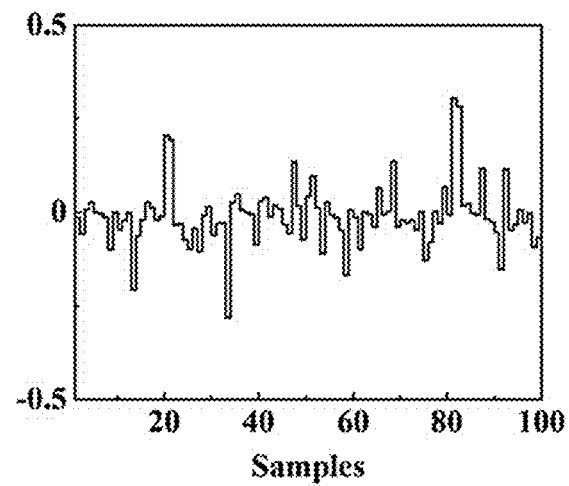

The LSTM was trained using the Adam algorithm in the MATLAB R2021a environment. Considering the tradeoff between the accuracy and computational performance, it was found that the delay of time steps for the input and output $n_u=n_y=2$, and the number of the hidden states in the LSTM structure $n_p=10$ gave an acceptable performance. FIG. 20A shows the focus score prediction performance of the trained LSTM network and FIG. 20B shows the corresponding prediction error. It can be concluded that the trained LSTM network adequately learns the nonlinear dynamics of the PEMS and has a high prediction RMSE of 0.19.

Autofocus Testing. Proper evaluation of the proposed LSTM-based MPC AF algorithm involved comparison against the commonly used rule-based approaches and state-of-the-art deep learning methods previously mentioned. Although all methods were directly compared against one another, the rule-based approaches were included to serve as different baseline comparisons for the performance of the deep learning methods. The random search algorithm was included to demonstrate the absolute lower limit of rule-based approaches.

Experimental evaluation of each method comprised approximately 100 individual AF experiments on the air force target (FIG. 16B). For each experiment, the IAS was manually moved to a different location such that a wide variety of optimal focus target positions were included in the IAS working distance. An experiment began with an initial random position of the target before the working distance was searched according to the rule-based and deep learning-based algorithms. For the proposed method, two sequential random positions were selected first as the delay of time steps $n_u=n_y=2$. The position information and the focus scores of these two images were then used to form the initial input vector x to the LSTM to predict the focus position. Based on the LSTM-based MPC scheme, a control law was designed based on the case where P=7, M=2, λ=0.01, and η=0.005. The experiment ended when the focus score presented to the computer was equal to or greater than the minimum considered to reside in the DOF. For the experiments, a MAG focus score of 6.1 or greater corresponded to focused positions in the 3.2 µm DOF of the experimental 10× lens.

As shown in the table of FIG. 21A, the performance of the AF methods was comparatively evaluated using the three metrics, the mean and standard deviation of the number of images taken, as well as the mean time to completion. Regarding the control of each method, only the proposed and random search methods were capable of running in open-loop (OL) due to the black-box learning of the non-linear dynamics and irrelevant absolute position required for a random search. All the other methods require absolute position information, i.e., closed-loop (CL) control, to guarantee a successful convergence. The CL mode is an embedded electronic closed-loop system that compensates for the hysteresis of the piezo actuator with a settling time of 50 ms. From the table of FIG. 21A, it can be seen that in the CL mode, learning-based methods have no advantage over rule-based methods, as the positioning control is well managed by the embedded controller. Regarding the mean and standard deviation of images in the CL mode, the Fibonacci method shows slightly better performance than the proposed method. For the OL mode, our proposed method has the fastest AF speed. Compared with the proposed method in CL mode, the existence of hysteresis effects adds difficulties in modeling the PEMS which leads to an increase in both the average number and standard deviation of the images needed for AF. However, the searching speed in OL mode (25 ms) is 2.4 times faster than the searching speed in CL mode (60 ms) which compensates for the increase in searching attempts caused by the hysteresis effects.

To test the generalization ability of the proposed LSTM-based MPC AF method, a micro-scale circuit was used as the new AF target as shown in FIG. 16C. As the circuit target was never seen in the training data, the CNN and the ConvLSTM method cannot find the optimal focus position. However, since the input to the proposed LSTM network is the focus score and is irrelevant to the contents in the target, it can still predict the focus position with a mean number of images of 6.79 and a standard deviation of 5.25. As a result, the proposed method shows superiority in the generalization ability over other image-based AF methods.

Additionally, the specific time cost of each routine in the proposed method is shown in the table of FIG. 21B. The cost of the proposed LSTM-based MPC AF method can be broken down into 4 separate steps: image acquisition, image processing to get the focus score, optimization of the MPC cost function, and motor movement. Inside the optimization of the MPC cost function, the convergence of the U in Eq. (10) needs 50 iterations. Since the improved BPTT method was applied in the optimization of the MPC cost function, the optimization process only takes 14.8% of the overall AF time.

In this disclosure, a new control concept of PEMS in AF applications is presented. Compared with traditional applications of PEMS which require an internal controller to account for the hysteresis effects, the focus measurement and the hysteresis effects can be integrated in a single learning-based model. The optimal focus position can be inferred using the focus scores from a sequence of images in a NN-based MPC architecture. To learn the hysteresis effect, the NN architecture is chosen to be LSTM due to its superior ability to draw inferences from learned time sequence data. To improve the speed of the LSTM-based MPC control, an optimized LSTM backpropagation algorithm is proposed. Additionally, to reduce the vibrations from the rapid PEMS impulse inputs, a unique S-curve control input profile can be designed to reduce the acceleration profile. This promotes a more stable transition in dynamics, and ultimately improves the accuracy of the proposed LSTM-based MPC AF control scheme. Compared with baseline ruled-based AF methods and other deep learning-based methods, the disclosed method demonstrates significant advantages regarding the AF time. Finally, it should be noted that the proposed control concept of PEMS is not limited to the sole application of AF. As long as sufficient pairs of PEMS and response variable training inputs can be acquired, the same control concept can be applied for other PEMS or PEA applications to save the efforts in designing the internal controller.

The AF methodologies of the present disclosure can be implemented in hardware, software, firmware, or a combination thereof. In various embodiment(s), the AF methodologies can be implemented in software or firmware that is stored in a memory and that is executed by a suitable instruction execution system. If implemented in hardware, as in an alternative embodiment, the AF methodologies can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIGS. 6 and 15A-15C illustrate examples of architecture, functionality, and operation of a possible implementation of the AF methodologies. In this regard, each block represents a module, segment, or portion of code, which comprises one or more executable instructions for implementing the specified logical function(s). It should also be noted that in some alternative implementations, the functions noted in the blocks may occur out of the order noted. For example, two blocks may in fact be executed substantially concurrently or the blocks may sometimes be executed in the reverse order, depending upon the functionality involved, as will be further clarified hereinbelow.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The AF methodologies, which can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present disclosure includes embodying the functionality of the preferred embodiments of the present disclosure in logic embodied in hardware or software-configured mediums.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for autofocusing, comprising:
   obtaining a first image of a target with a camera;
   adjusting focus of the camera by a specified autofocus (AF) bin step size;
   obtaining a second image of the target with the camera;
   adjusting focus of the camera by the specified AF bin step size;
   obtaining a third image of the target with the camera;
   determining an optimal focus based at least in part upon focus measure (FM) data of the second and third images, the optimal focus determined using a direct Gaussian mean calculation; and
   adjusting focus of the camera to the optimal focus.

2. The method of claim 1, wherein the FM data comprises Gaussian derivative FM scores.

3. The method of claim 2, wherein the optimal focus is determined in response to the FM score of the third image being less than or equal to the FM score of the second image, wherein the optimal focus is based at least in part upon FM data of the first, second and third images.

4. The method of claim 2, comprising:
   adjusting focus of the camera by the specified AF bin step size; and
   obtaining a fourth image of the target with the camera in response to the FM score of the third image being less than the FM score of the second image, wherein the optimal focus is based at least in part upon FM data of the second, third and fourth images.

5. The method of claim 1, wherein the specified AF bin step size is determined based at least in part upon a defocus gradient of a Gaussian FM curve associated with the camera.

6. The method of claim 5, wherein the specified AF bin step size is selected based upon standard deviation of the Gaussian FM curve.

7. The method of claim 1, comprising obtaining an image of the target with the camera at the optimal focus.

8. The method of claim 7, wherein the target is an item or component for inspection.

9. The method of claim 7, wherein the method for autofocus is initiated in response to detecting the target.

10. A method for autofocus, comprising:
    generating an input vector comprising a sequence of input-output pairs associated with a piezoelectric controlled motion stage configured to position a camera relative to a target;
    determine a control input for the piezoelectric controlled motion stage using a long short-term memory (LSTM) backpropagation network trained to minimize a cost function over a defined prediction horizon; and
    applying the control input to the piezoelectric controlled motion stage, the control input shaped by an S-curve control input profile.

11. The method of claim 10, wherein the piezoelectric controlled motion stage is a piezoelectric motion stage.

12. The method of claim 10, wherein the piezoelectric controlled motion stage comprises piezoelectric actuators.

13. The method of claim 10, wherein the input vector comprises position information of the piezoelectric controlled motion stage and focus scores of images captured by the camera at corresponding positions.

14. The method of claim 10, wherein the cost function comprises a squared error between a reference signal and a predicted output of the LSTM backpropagation network and a weighted squared change of the control input.

15. The method of claim 10, wherein the LSTM backpropagation network is trained using a backpropagation through time (BPTT) algorithm comprising pre-allocation for expedited gradient calculation.

16. The method of claim 15, wherein the BPTT algorithm comprises calculating derivatives of predicted focus measurement to generated intermediate control input by applying a chain rule through time.

17. The method of claim 10, comprising training the LSTM backpropagation network with training data generated using a pulse-train method applied to the piezoelectric controlled motion stage.

18. The method of claim 17, wherein the pulse-train method comprises applying a series of pulses with random amplitudes to capture nonlinear dynamics of the piezoelectric controlled motion stage.

* * * * *